United States Patent
Shida

(10) Patent No.: US 8,996,274 B2
(45) Date of Patent: Mar. 31, 2015

(54) VEHICLE CONTROL DEVICE AND VEHICLE CONTROL METHOD

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 55 days.

(21) Appl. No.: 13/813,762

(22) PCT Filed: Aug. 10, 2011

(86) PCT No.: PCT/IB2011/001840
§ 371 (c)(1),
(2), (4) Date: Feb. 1, 2013

(87) PCT Pub. No.: WO2012/020300
PCT Pub. Date: Feb. 16, 2012

(65) Prior Publication Data
US 2013/0144502 A1   Jun. 6, 2013

(30) Foreign Application Priority Data
Aug. 11, 2010   (JP) .................................. 2010-180450

(51) Int. Cl.
*B60T 7/12* (2006.01)
*G05D 1/00* (2006.01)
(Continued)

(52) U.S. Cl.
CPC .............. *B60K 31/00* (2013.01); *B60K 31/0008* (2013.01); *B60K 2310/262* (2013.01); *B60W 2550/10* (2013.01); *B60W 2550/306* (2013.01); *G01S 13/931* (2013.01); *G01S 2013/9325* (2013.01); *G01S 2013/9346* (2013.01); *G01S 2013/935* (2013.01); *G01S 2013/9353* (2013.01); *G01S 2013/936* (2013.01); *G08G 1/22* (2013.01); *B60K 2310/28* (2013.01); *B60W 30/16* (2013.01); *B60K 2031/0033* (2013.01);
(Continued)

(58) Field of Classification Search
USPC ........... 701/1, 23, 24, 36, 70, 93, 94, 96, 300, 701/301
See application file for complete search history.

(56) References Cited

U.S. PATENT DOCUMENTS 5,978,724 A * 11/1999 Sekine ............................ 701/70
7,966,119 B2 * 6/2011 Sugano et al. ................. 701/96
(Continued)

FOREIGN PATENT DOCUMENTS

| JP | A-5-50901  | 3/1993  |
| JP | A-5-270780 | 10/1993 |

(Continued)

*Primary Examiner* — Rami Khatib
(74) *Attorney, Agent, or Firm* — Oliff PLC

(57) ABSTRACT

Vehicle control includes: acquiring running information of a preceding vehicle that runs ahead of a host vehicle; controlling a running state of the host vehicle on the basis of the acquired running information; acquiring deceleration jerk information of the preceding vehicle; and changing a deceleration start timing, at which the host vehicle is decelerated in response to deceleration of the preceding vehicle, on the basis of the deceleration jerk information of the preceding vehicle. Alternatively, vehicle control includes: acquiring deceleration jerk information of a preceding vehicle that runs ahead of a host vehicle; and changing an inter-vehicle time or inter-vehicle distance between the preceding vehicle and the host vehicle on the basis of the deceleration jerk information of the preceding vehicle.

12 Claims, 12 Drawing Sheets

(51) Int. Cl.
  *G06F 7/00* (2006.01)
  *G06F 17/00* (2006.01)
  *B60K 31/00* (2006.01)
  *G01S 13/93* (2006.01)
  *G08G 1/00* (2006.01)
  *B60W 30/16* (2012.01)

(52) U.S. Cl.
  CPC .... *B60W 2550/302* (2013.01); *B60K 2310/264* (2013.01)
  USPC .............. 701/96; 701/70; 701/93; 701/94

(56) References Cited

U.S. PATENT DOCUMENTS

| | | | |
|---|---|---|---|
| 8,219,311 B2* | 7/2012 | Sugano et al. | 701/301 |
| 2006/0229793 A1* | 10/2006 | Sawamoto et al. | 701/96 |
| 2007/0213915 A1* | 9/2007 | Tange et al. | 701/96 |
| 2010/0198513 A1* | 8/2010 | Zeng et al. | 701/300 |
| 2010/0256852 A1* | 10/2010 | Mudalige | 701/24 |
| 2011/0004387 A1* | 1/2011 | Sugano et al. | 701/96 |
| 2012/0109421 A1* | 5/2012 | Scarola | 701/2 |

FOREIGN PATENT DOCUMENTS

| | | |
|---|---|---|
| JP | A-6-270780 | 9/1994 |
| JP | A-8-85417 | 4/1996 |
| JP | A-9-27100 | 1/1997 |
| JP | A-2001-254641 | 9/2001 |
| JP | A-2003-137003 | 5/2003 |

\* cited by examiner

F I G . 9
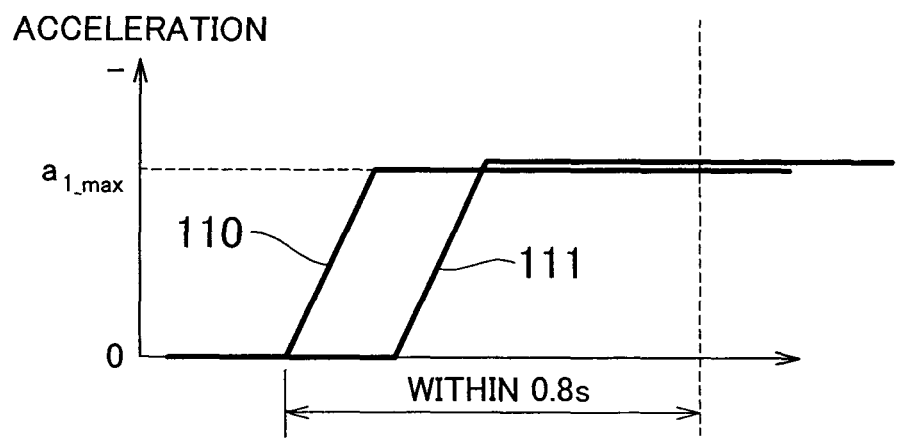
F I G . 10
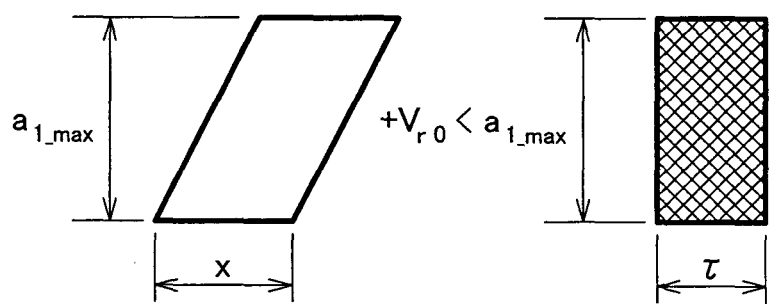

F I G . 12
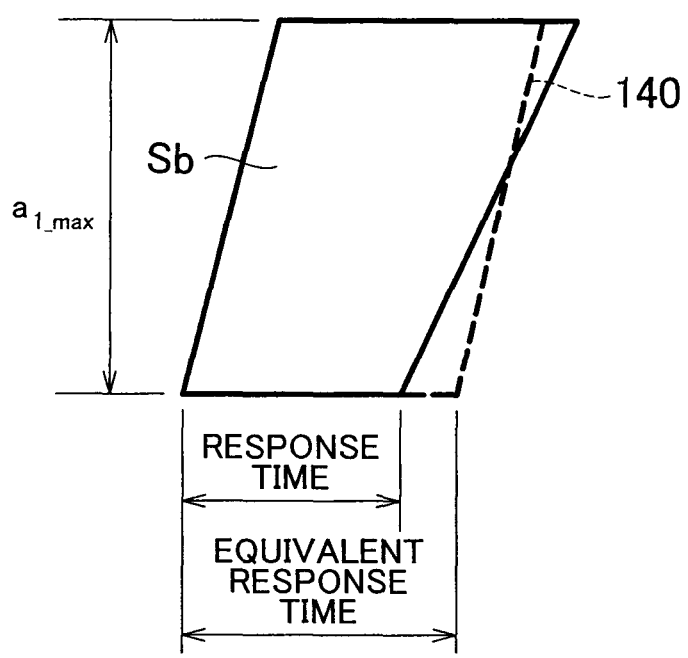

VEHICLE CONTROL DEVICE AND VEHICLE CONTROL METHOD

BACKGROUND OF THE INVENTION

1. Field of the Invention

The invention relates to a vehicle control device and a vehicle control method.

2. Description of Related Art

In recent vehicles, a control device that automatically executes control during running of the vehicle has been developed in order to improve ease of driving during running of the vehicle, reduce a burden on driver's driving operation and further improve safety during running of the vehicle.

For example, in a vehicle rear-end collision prevention system described in Japanese Patent Application Publication No. 9-27100 (JP-A-9-27100), a vehicle that runs ahead (preceding vehicle) is extracted from a captured image ahead of a host vehicle and, when there is a possibility that the host vehicle hits the rear end of the preceding vehicle, automatic braking is performed. In addition, when it is determined whether there is a possibility that the host vehicle hits the rear end of a preceding vehicle, the size of the vehicle extracted from the captured image is determined, and, for example, when the preceding vehicle is a small-sized vehicle, deceleration timing is advanced or the braking force of a braking mechanism is increased in preparation for sudden braking of the preceding vehicle having high braking performance. By so doing, it is possible to appropriately prevent the host vehicle from hitting the rear end of the preceding vehicle.

Here, in recent years, there has been developed follow-up running control that causes a host vehicle to follow a preceding vehicle to reduce a burden on a driver. In the follow-up running control, the host vehicle is accelerated or decelerated so as to keep an inter-vehicle time between the preceding vehicle and the host vehicle (that is, a time that elapses until the front end of the host vehicle reaches the same position as the current position of the rear end of the preceding vehicle) at a predetermined period of time. However, the braking response characteristic at the time of braking may significantly vary depending on the type of a vehicle, and, when a variation in the deceleration of a preceding vehicle is larger than a variation in the deceleration of the host vehicle, it is difficult to keep the inter-vehicle time between the preceding vehicle and the host vehicle during deceleration of the preceding vehicle. In this case, there has been a case where it is difficult to continue follow-up running.

SUMMARY OF THE INVENTION

The invention provides a vehicle control device and a vehicle control method that are able to appropriately decelerate a host vehicle during follow-up running control irrespective of a relative difference in braking response characteristic between a preceding vehicle and the host vehicle.

A first aspect of the invention relates to a vehicle control device. The vehicle control device includes: a follow-up running control unit that acquires running information of a preceding vehicle that runs ahead of a host vehicle and that controls a running state of the host vehicle on the basis of the acquired running information; a deceleration jerk acquisition unit that acquires deceleration jerk information of the preceding vehicle; and a deceleration timing control unit that changes a deceleration start timing, at which the follow-up running control unit decelerates the host vehicle in response to deceleration of the preceding vehicle, on the basis of the deceleration jerk information of the preceding vehicle.

A second aspect of the invention relates to a vehicle control device. The vehicle control device includes: a follow-up running control unit that acquires running information of a preceding vehicle that runs ahead of a host vehicle and that controls a running state of the host vehicle on the basis of the acquired running information; a deceleration jerk acquisition unit that acquires deceleration jerk information of the preceding vehicle; and a deceleration timing advance unit that advances a deceleration start timing, at which the follow-up running control unit decelerates the host vehicle, when deceleration jerk performance of the preceding vehicle is higher than deceleration jerk performance of the host vehicle as compared with when the deceleration jerk performance of the preceding vehicle is lower than the deceleration jerk performance of the host vehicle.

A third aspect of the invention relates to a vehicle control device. The vehicle control device includes: a deceleration jerk acquisition unit that acquires deceleration jerk information of a preceding vehicle that runs ahead of a host vehicle; and an inter-vehicle control unit that changes an inter-vehicle time or inter-vehicle distance between the preceding vehicle and the host vehicle on the basis of the deceleration jerk information of the preceding vehicle.

A fourth aspect of the invention relates to a vehicle control device. The vehicle control device includes: a deceleration jerk acquisition unit that acquires deceleration jerk information of a preceding vehicle that runs ahead of a host vehicle; and an inter-vehicle relation increasing unit that increases an inter-vehicle time or inter-vehicle distance between the preceding vehicle and the host vehicle when deceleration jerk performance of the preceding vehicle is higher than deceleration jerk performance of the host vehicle as compared with when the deceleration jerk performance of the preceding vehicle is lower than the deceleration jerk performance of the host vehicle.

In the above vehicle control device, the inter-vehicle relation increasing unit may increase the inter-vehicle time between the preceding vehicle and the host vehicle when deceleration jerk performance of the preceding vehicle is higher than deceleration jerk performance of the host vehicle as compared with when the deceleration jerk performance of the preceding vehicle is lower than the deceleration jerk performance of the host vehicle, the vehicle control device may further include a communication breakdown determining unit that determines a communication breakdown, when the communication breakdown determining unit detects a communication breakdown when the deceleration jerk acquisition unit acquires deceleration jerk information, and when the increased inter-vehicle time is shorter than a time that is obtained by adding a response delay time of an actuator, which causes deceleration of the host vehicle, to an acquisition delay time of the deceleration jerk information, the communication breakdown determining unit may notify a driver of the host vehicle of the communication breakdown when the communication breakdown is determined.

In the above vehicle control device, the actuator may be a brake hydraulic control device, and when the acquisition delay time of the deceleration jerk information has elapsed, preparations for increasing hydraulic pressure by the brake hydraulic control device may be made before the communication breakdown is determined.

In the vehicle control device, the deceleration jerk acquisition unit may acquire the deceleration jerk information of the preceding vehicle through inter-vehicle communication.

A fifth aspect of the invention relates to a vehicle control method. The vehicle control method includes: acquiring running information of a preceding vehicle that runs ahead of a host vehicle; controlling a running state of the host vehicle on the basis of the acquired running information; acquiring deceleration jerk information of the preceding vehicle; and changing a deceleration start timing, at which the host vehicle is decelerated in response to deceleration of the preceding vehicle, on the basis of the deceleration jerk information of the preceding vehicle.

A sixth aspect of the invention relates to a vehicle control method. The vehicle control method includes: acquiring deceleration jerk information of a preceding vehicle that runs ahead of a host vehicle; and changing an inter-vehicle time or inter-vehicle distance between the preceding vehicle and the host vehicle on the basis of the deceleration jerk information of the preceding vehicle.

It is advantageous that the vehicle control devices and vehicle control methods according to the first to sixth aspects of the invention are able to appropriately decelerate the host vehicle during follow-up running control at the time of deceleration of the preceding vehicle irrespective of a relative difference in braking response characteristic between the preceding vehicle and the host vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a time chart that illustrates the acceleration of the preceding vehicle and the acceleration of the host vehicle at the time of deceleration during follow-up running control according to the embodiment of the invention;

FIG. 10 is a view that illustrates an equivalent response time according to the embodiment of the invention;

FIG. 12 is a view that illustrates an equivalent response time according to the embodiment of the invention;

DETAILED DESCRIPTION OF EMBODIMENTS

Hereinafter, a vehicle control device according to an embodiment of the invention will be described in detail with reference to the accompanying drawings. Note that the embodiment does not limit the aspects of the invention. In addition, components in the following embodiment encompass the ones that can be easily replaced by persons skilled in the art and the ones that are substantially equivalent to the components.

Embodiment

Figure 1:
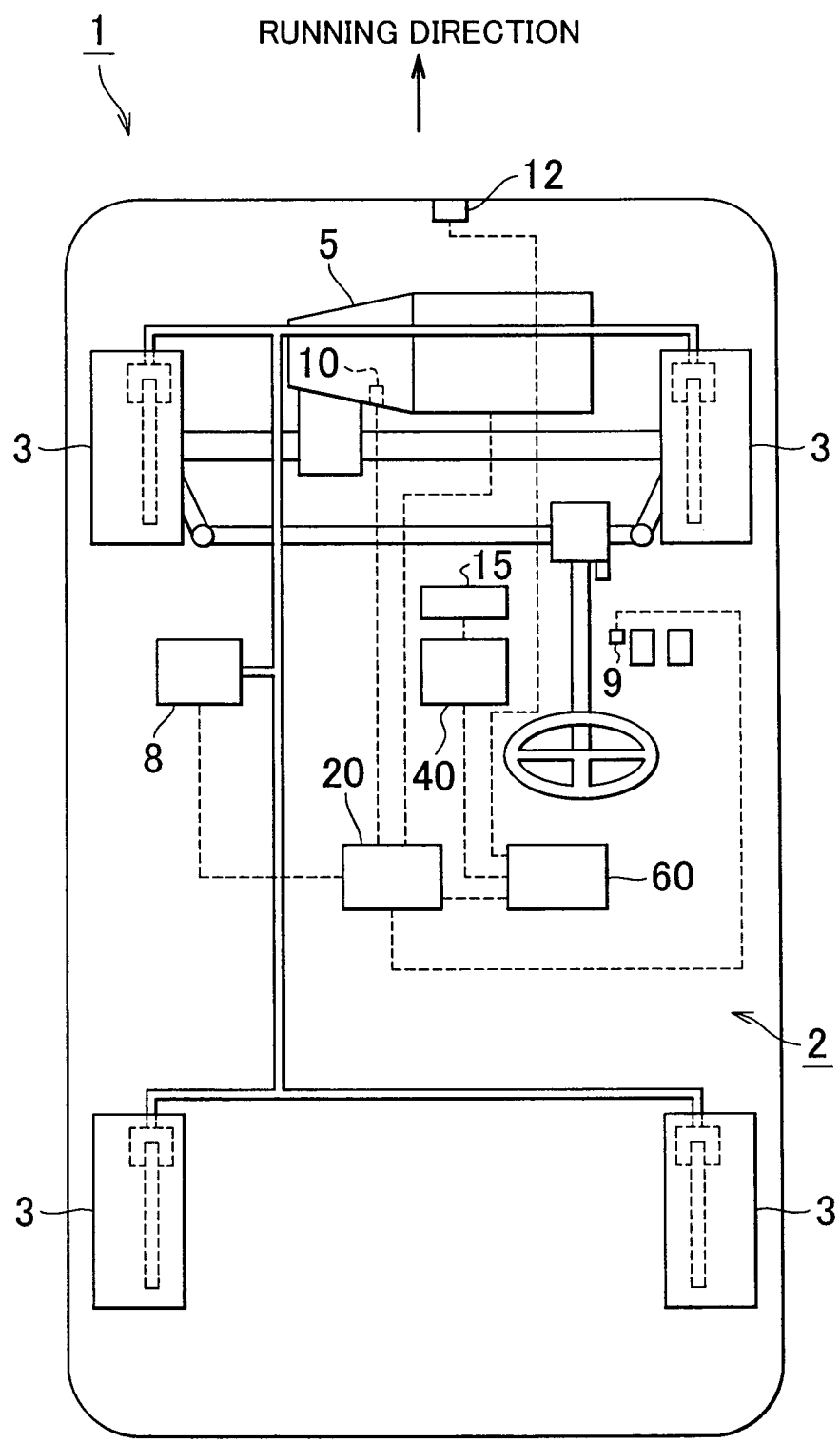
FIG. 1 is a schematic view of a vehicle equipped with a vehicle control device according to an embodiment of the invention.

FIG. 1 is a schematic view of a vehicle provided with the vehicle control device according to the embodiment of the invention. The vehicle 1 provided with the vehicle control device 2 according to the embodiment is equipped with an engine 5, which is an internal combustion engine, as a power source. The vehicle 1 is able to run in such a manner that power generated by the engine 5 is transmitted to wheels 3 via a driving device, such as an automatic transmission (not shown). In addition, the vehicle 1 includes a brake device (not shown) and a brake hydraulic control device 8. The brake device is a braking device that brakes the wheels 3 to brake the moving vehicle 1. The brake hydraulic control device 8 controls hydraulic pressure for activating the brake device. In addition, a vehicle speed sensor 10 is provided for the driving device. The vehicle speed sensor 10 is a vehicle speed detecting device that detects a rotational speed at the time when the power of the engine 5 is transmitted to the wheels 3 to thereby detect a vehicle speed.

In addition, the vehicle 1 includes a radar 12 and an inter-vehicle communication device 15. The radar 12 is a forward condition detecting device that detects another vehicle running ahead, an obstacle located in the running direction, or the like. The inter-vehicle communication device 15 is able to communicate information about a running state, or the like, with another vehicle. The radar 12 may be any radar that may be equipped for the vehicle 1, such as a laser radar that uses a laser beam as a detection wave and a millimeter wave radar that uses a millimeter wave. In addition, the inter-vehicle communication device 15 includes devices required to carry out wireless communication, such as an antenna for transmitting and receiving electromagnetic waves, a transmitting device for signals and a receiving device for signals.

These engine 5, brake hydraulic control device 8, vehicle speed sensor 10, radar 12 and inter-vehicle communication device 15 are equipped for the vehicle 1, and are connected to an electronic control unit (ECU) that controls various portions of the vehicle 1. The ECU includes a running control ECU 20, a communication follow-up running control ECU 40 and an autonomous follow-up running control ECU 60. The running control ECU 20 executes running control over the vehicle 1. The communication follow-up running control ECU 40 executes communication follow-up running control that is running control for causing a host vehicle to follow a preceding vehicle while communicating with another vehicle. The autonomous follow-up running control ECU 60 executes autonomous follow-up running control that is running control for causing the host vehicle to autonomously follow a preceding vehicle without communicating with another vehicle. That is, the communication follow-up running control ECU 40 and the autonomous follow-up running control ECU 60 each are provided as a follow-up running control unit that acquires the running information of a preceding vehicle running ahead of the host vehicle and that controls the running state of the host vehicle on the basis of the acquired running information.

Figure 2:
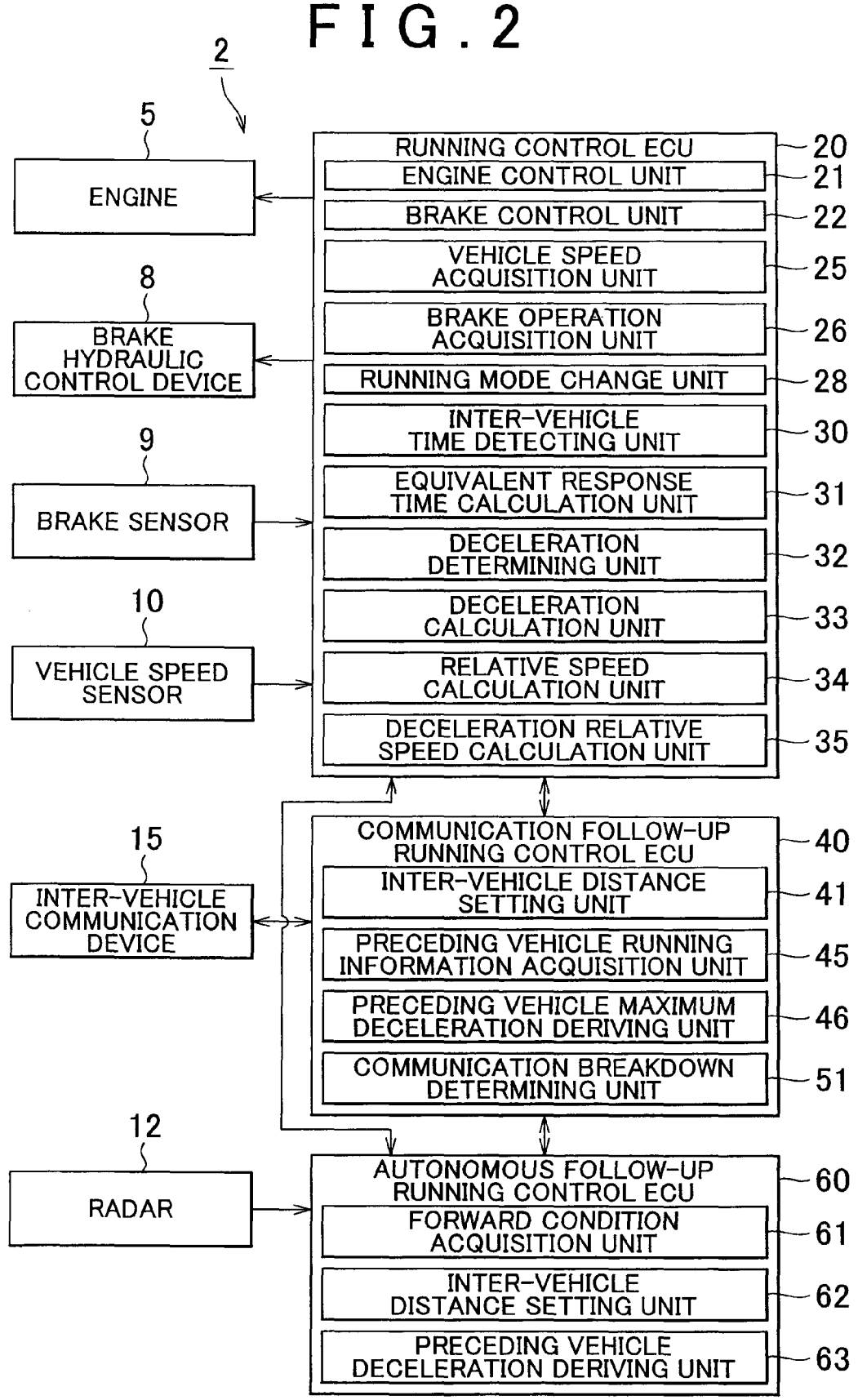
FIG. 2 is a configuration view of a relevant portion of the vehicle control device shown in FIG. 1 according to the embodiment of the invention.

FIG. 2 is a configuration view of a relevant portion of the vehicle control device shown in FIG. 1. Among the components connected to the ECU, devices used to drive the vehicle 1, such as the engine 5, the brake hydraulic control device 8 and the vehicle speed sensor 10, are connected to the running control ECU 20, and, in addition, a brake sensor 9 is connected to the running control ECU 20. The brake sensor 9 detects an operation amount by which a driver operates a brake pedal (not shown) at the time of deceleration of the vehicle 1. The running control ECU 20 activates the engine 5, the brake hydraulic control device 8, and the like, on the basis of the results detected by the detecting devices, such as the vehicle speed sensor 10 and the brake sensor 9, to execute running control over the vehicle 1.

In addition, the inter-vehicle communication device 15, which is used to communicate with another vehicle, is connected to the communication follow-up running control ECU 40. The communication follow-up running control ECU 40 executes running control over the vehicle 1 by transmitting a control signal to the running control ECU 20 while communicating information about a running state, or the like, with another vehicle using the inter-vehicle communication device 15 to thereby execute communication follow-up running control. In addition, the radar 12, which detects another vehicle, or the like, running ahead and may be used in autonomous follow-up running control, is connected to the autonomous follow-up running control ECU 60. The autonomous follow-up running control ECU 60 executes running control over the vehicle 1 by transmitting a control signal to the running control ECU 20 while detecting a preceding vehicle using the radar 12 to thereby execute autonomous follow-up running control.

In addition, the running control ECU 20, the communication follow-up running control ECU 40 and the autonomous follow-up running control ECU 60 are connected to one another, and are able to exchange information or signals. The hardware configuration of these running control ECU 20, communication follow-up running control ECU 40 and autonomous follow-up running control ECU 60 is a known configuration that includes a processing unit having a central processing unit (CPU), or the like, a storage unit, such as a random access memory (RAM), and the like, so the description thereof is omitted.

Among these ECUs, the running control ECU 20 includes an engine control unit 21, a brake control unit 22, a vehicle speed acquisition unit 25, a brake operation acquisition unit 26, a running mode change unit 28, an inter-vehicle time detecting unit 30, an equivalent response time calculation unit 31, a deceleration determining unit 32, a deceleration calculation unit 33, a relative speed calculation unit 34 and a deceleration relative speed calculation unit 35. The engine control unit 21 executes operation control over the engine 5. The brake control unit 22 controls the brake hydraulic control device 8 to control braking force. The vehicle speed acquisition unit 25 acquires a vehicle speed from the result detected by the vehicle speed sensor 10. The brake operation acquisition unit 26 acquires a state in which the brake pedal is operated from the result detected by the brake sensor 9. The running mode change unit 28 changes the running mode during running of the vehicle 1 among communication follow-up running control, autonomous follow-up running control and manual running control. In the manual running control, these follow-up running controls are not executed, and the driver drives the vehicle 1. The inter-vehicle time detecting unit 30 detects an inter-vehicle time between the host vehicle and a preceding vehicle (that is, a time that elapses until the front end of the host vehicle reaches the same position as the current position of the rear end of the preceding vehicle) on the basis of the result detected by the radar 12. The equivalent response time calculation unit 31 calculates an equivalent response time in such a manner that a response time of the host vehicle after deceleration of the preceding vehicle in the case where the deceleration jerk of the host vehicle and the deceleration jerk of the preceding vehicle at the time of deceleration are different from each other is replaced with a response time in the case where the deceleration jerks of both vehicles are the same. The deceleration determining unit 32 determines whether the host vehicle is able to decelerate at a deceleration such that the equivalent response time at the time of deceleration of the preceding vehicle is shorter than a current inter-vehicle time. The deceleration calculation unit 33 calculates the deceleration of the host vehicle on the basis of the deceleration of the preceding vehicle. The relative speed calculation unit 34 calculates the relative speed with respect to the preceding vehicle on the basis of the result detected by the radar 12. The deceleration relative speed calculation unit 35 calculates a relative speed that is used to execute deceleration control.

In addition, the communication follow-up running control ECU 40 includes an inter-vehicle distance setting unit 41, a preceding vehicle running information acquisition unit 45, a preceding vehicle maximum deceleration deriving unit 46 and a communication breakdown determining unit 51. The inter-vehicle distance setting unit 41 sets an inter-vehicle distance during communication follow-up running control on the basis of an inter-vehicle time preset for communication follow-up running control. The preceding vehicle running information acquisition unit 45 acquires the running information of the preceding vehicle through inter-vehicle communication carried out by the inter-vehicle communication device 15. The preceding vehicle maximum deceleration deriving unit 46 derives a maximum deceleration at the time of deceleration of the preceding vehicle. The communication breakdown determining unit 51 determines whether communication with the preceding vehicle using the inter-vehicle communication device 15 is lost.

In addition, the autonomous follow-up running control ECU 60 includes a forward condition acquisition unit 61, an inter-vehicle distance setting unit 62 and a preceding vehicle deceleration deriving unit 63. The forward condition acquisition unit 61 acquires a condition ahead of the vehicle 1 from the result detected by the radar 12. The inter-vehicle distance setting unit 62 sets an inter-vehicle distance during autonomous follow-up running control on the basis of an inter-vehicle time preset for autonomous follow-up running control and a vehicle speed acquired by the vehicle speed acquisition unit 25. The preceding vehicle deceleration deriving unit 63 derives a deceleration at the time of deceleration of the preceding vehicle.

The vehicle control device 2 according to the embodiment is formed of the above described components, and, hereinafter, the operation of the vehicle control device 2 will be described. During normal running of the vehicle 1, the driver operates an accelerator pedal (not shown) or the brake pedal to activate an actuator, such as the engine 5 and the brake hydraulic control device 8, and the vehicle 1 runs in response to driver's driving operation. For example, when power generated by the engine 5 is adjusted, the engine control unit 21 of the running control ECU 20 is used to control the engine 5; when braking force is generated, the brake control unit 22 of the running control ECU 20 is used to control the brake hydraulic control device 8 to thereby generate braking force.

In addition, during running of the vehicle 1, the running state of the vehicle 1 and the driving operation of the driver are detected by sensors provided at various portions of the vehicle 1, and the running state and the driving operation are used in running control over the vehicle 1. For example, the result detected by the vehicle speed sensor 10 is acquired by the vehicle speed acquisition unit 25 of the running control ECU 20, and is used when running control is executed using a vehicle speed. Similarly, the result detected by the brake sensor 9 is acquired by the brake operation acquisition unit 26 of the running control ECU 20 as an operation amount by which the driver performs brake operation, and the brake control unit 22 is used to control the brake hydraulic control device 8 on the basis of the acquired operation amount to thereby generate braking force.

In addition, the vehicle 1 is able to execute follow-up running control in which the vehicle 1 follows another vehicle running ahead where necessary on the basis of driver's intention, such as operating an operation switch (not shown) for follow-up running. That is, the vehicle 1 is able to execute follow-up running control as running control for assisting driver's driving operation. The follow-up running control is divided into communication follow-up running control and autonomous follow-up running control on the basis of the state of the vehicle 1 during running.

Figure 3:
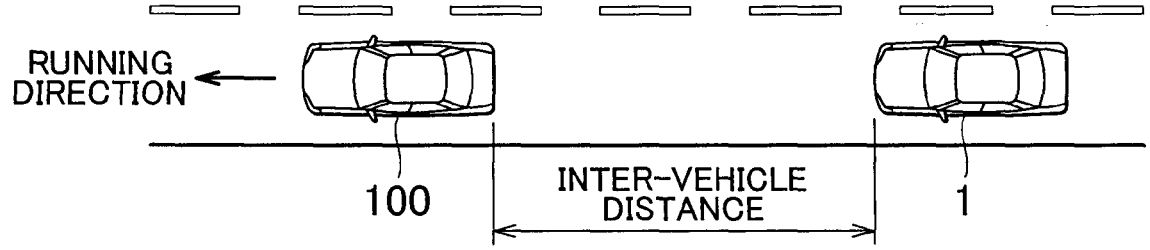
FIG. 3 is a view that illustrates follow-up running according to the embodiment of the invention.

FIG. 3 is a view that illustrates follow-up running. First, the autonomous follow-up running control will be described. When the autonomous follow-up running control is executed, the radar 12 is used to detect a condition ahead of the vehicle 1, and the forward condition acquisition unit 61 of the autonomous follow-up running control ECU 60 is used to acquire the condition ahead of the vehicle 1 on the basis of the result detected by the radar 12. The forward condition acquisition unit 61 detects whether there is a preceding vehicle 100 that is another vehicle running ahead of the vehicle 1. When there is the preceding vehicle 100, the forward condition acquisition unit 61 acquires the distance to the preceding vehicle 100 on the basis of the result detected by the radar 12.

In addition, during autonomous follow-up running control, the inter-vehicle distance setting unit 62 is used to set an inter-vehicle distance corresponding to the vehicle speed acquired by the vehicle speed acquisition unit 25 of the running control ECU 20. When the inter-vehicle distance is set, the inter-vehicle distance setting unit 62 sets the inter-vehicle distance on the basis of an autonomous follow-up running inter-vehicle time and the vehicle speed acquired by the vehicle speed acquisition unit 25 of the running control ECU 20. The autonomous follow-up running inter-vehicle time is preset as an appropriate time between the vehicle 1 and the preceding vehicle 100 for autonomous follow-up running, and is stored in the storage unit.

The autonomous follow-up running control ECU 60 transmits a signal to the running control ECU 20 so as to adjust the speed of the vehicle 1 so that the inter-vehicle distance between the vehicle 1 and the preceding vehicle 100, acquired by the forward condition acquisition unit 61, is substantially equal to the inter-vehicle distance set by the inter-vehicle distance setting unit 62. When the running control ECU 20 has received the signal, the running control ECU 20 uses the engine control unit 21 to adjust driving force or uses the brake control unit 22 to adjust braking force to thereby keep the inter-vehicle distance between the vehicle 1 and the preceding vehicle 100 at a distance substantially equal to the inter-vehicle distance set by the inter-vehicle distance setting unit 62. By so doing, follow-up running in which the vehicle 1 follows the preceding vehicle 100 is carried out.

Next, the communication follow-up running control will be described. The communication follow-up running control is executed when another vehicle that runs around is a communication vehicle that is able to communicate running information with the vehicle 1. That is, when the preceding vehicle 100 is a communication vehicle, communication follow-up running control may be executed. When the communication follow-up running control is executed, inter-vehicle communication is carried out between the vehicle 1 and the preceding vehicle 100 via the inter-vehicle communication device 15 to acquire the running information of the preceding vehicle 100.

The running information of the preceding vehicle 100, transmitted from the preceding vehicle 100 via inter-vehicle communication between the vehicle 1 and the preceding vehicle 100 by the inter-vehicle communication device 15, is acquired by the preceding vehicle running information acquisition unit 45 of the communication follow-up running control ECU 40. Note that the running information includes information about the moving state of the communication vehicle, information about driver's driving operation and positional information of the communication vehicle.

When the running information of the preceding vehicle 100 is acquired, the inter-vehicle distance between the vehicle 1 and the preceding vehicle 100 is set by the inter-vehicle distance setting unit 41 on the basis of the vehicle speed acquired by the vehicle speed acquisition unit 25, the vehicle speed of the preceding vehicle 100 and the current driving operation of the driver of the preceding vehicle 100. The inter-vehicle distance setting unit 41 sets the inter-vehicle distance during communication follow-up running control on the basis of a communication follow-up running inter-vehicle time, the vehicle speed acquired by the vehicle speed acquisition unit 25 and the running information of the preceding vehicle 100, acquired by the preceding vehicle running information acquisition unit 45 as in the case where the inter-vehicle distance during autonomous follow-up running control is set. The communication follow-up running inter-vehicle time is preset as an appropriate time between the vehicle 1 and the preceding vehicle 100 for communication follow-up running, and is stored in the storage unit. Note that the communication follow-up running inter-vehicle time is set so as to be shorter than the autonomous follow-up running inter-vehicle time. Therefore, the inter-vehicle distance during communication follow-up running is set so as to be shorter than the inter-vehicle distance during autonomous follow-up running.

The communication follow-up running control ECU 40 transmits a signal to the running control ECU 20 so as to adjust the speed of the vehicle 1 on the basis of the positional information of the preceding vehicle 100, acquired by the preceding vehicle running information acquisition unit 45, so that the inter-vehicle distance between the vehicle 1 and the preceding vehicle 100 is substantially equal to the inter-vehicle distance set by the inter-vehicle distance setting unit 41. In this way, the running control ECU 20, to which the signal is transmitted, adjusts driving force or braking force in accordance with the signal to keep the inter-vehicle distance between the vehicle 1 and the preceding vehicle 100 at a distance substantially equal to the inter-vehicle distance set by the inter-vehicle distance setting unit 41 to thereby carry out follow-up running in which the vehicle 1 follows the preceding vehicle 100.

Between these communication follow-up running control and autonomous follow-up running control, the communication follow-up running control is preferentially used, and these follow-up running controls are selectively used depending on the condition of communication with the preceding vehicle 100 in communication follow-up running control. Specifically, when follow-up running control is executed, the communication breakdown determining unit 51 of the communication follow-up running control ECU 40 determines whether communication with the preceding vehicle 100 using the inter-vehicle communication device 15 is lost, and then the communication follow-up running control ECU 40 transmits the determined result to the running control ECU 20. The running control ECU 20, to which the determined result is transmitted, changes the running mode by the running mode change unit 28 on the basis of the determined result.

The running mode change unit 28 is able to change the running mode among communication follow-up running control, autonomous follow-up running control and a manual mode. In the manual mode, the driver carries out driving operation to conduct all the driving commands without executing follow-up running control. When the running mode change unit 28 changes the running mode, the running mode change unit 28 changes the running mode also using the determination made by the communication breakdown determining unit 51.

The running mode change unit 28 changes the running mode as described above; however, when determination that communication is carried out with the preceding vehicle 100 is transmitted in a state where the driver has specified follow-up running, the running mode change unit 28 changes the running mode to communication follow-up running control. In addition, when determination that communication with the preceding vehicle 100 is lost is transmitted in a state where the driver has specified follow-up running, the running mode change unit 28 changes the running mode to autonomous follow-up running control. That is, when the driver has specified follow-up running, the communication follow-up running control is selected when communication with the preceding vehicle 100 is possible, and the running mode is changed to the autonomous follow-up running control when communication with the preceding vehicle 100 is lost. In addition, when the driver has not specified follow-up running, it is not determined whether communication is carried out with the preceding vehicle 100, and the running mode is changed to the manual mode.

When follow-up running is carried out, the running mode is changed between communication follow-up running control and autonomous follow-up running control depending on the condition of communication with the preceding vehicle 100 in this way to thereby execute running control in coordination with the running state of the preceding vehicle 100. In addition, at the time of deceleration of the preceding vehicle 100 while communication follow-up running control or autonomous follow-up running control is being executed, even during any follow-up control, the vehicle 1 in itself, that is, the host vehicle 1, is caused to decelerate at a deceleration equal to the deceleration of the preceding vehicle 100 by the time when the inter-vehicle time with respect to the preceding vehicle 100 elapses.

During follow-up running control, the host vehicle 1 is caused to decelerate on the basis of the deceleration of the preceding vehicle 100 in this way. Here, variations in the accelerations of both the host vehicle 1 and preceding vehicle 100 in the case where the preceding vehicle 100 decelerates will be described.

Figure 4:
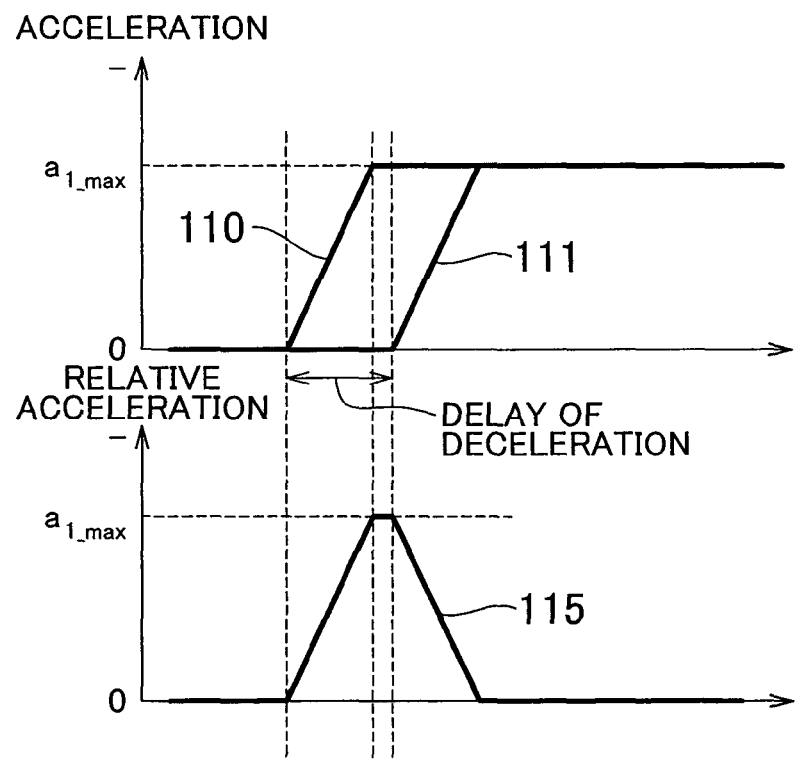
FIG. 4 is a time chart that illustrates the acceleration of a preceding vehicle, the acceleration of a host vehicle and the relative acceleration of the preceding vehicle with respect to the host vehicle at the time of deceleration of the preceding vehicle according to the embodiment of the invention.

FIG. 4 is a graph that illustrates the acceleration of the preceding vehicle, the acceleration of the host vehicle and the relative acceleration of the preceding vehicle with respect to the host vehicle at the time of deceleration of the preceding vehicle. In the case where the host vehicle 1 and the preceding vehicle 100 run at the same speed and the host vehicle 1 is running behind the preceding vehicle 100 in a state where the relative acceleration of the preceding vehicle 100 with respect to the host vehicle 1 is 0, when the preceding vehicle 100 decelerates, the acceleration in the decelerating direction increases, so a preceding vehicle acceleration 110 that is the acceleration of the preceding vehicle 100 increases in the decelerating direction, that is, the upward direction in FIG. 4. In this way, when the preceding vehicle 100 decelerates in a state where the speed of the host vehicle 1 remains unchanged and then the preceding vehicle acceleration 110 increases, there occurs a difference in acceleration between the preceding vehicle 100 and the host vehicle 1. By so doing, a relative acceleration 115 of the preceding vehicle 100 with respect to the host vehicle 1 increases.

Normally, when the vehicle decelerates, the deceleration increases with a lapse of time from a deceleration of 0 to a predetermined deceleration, such as a maximum deceleration corresponding to the driving condition at that time, and once the deceleration reaches the predetermined deceleration, the vehicle continues to decelerate at that deceleration. Therefore, the preceding vehicle acceleration 110 becomes constant at a maximum deceleration $a_{1\_max}$, and the preceding vehicle 100 continues to decelerate at the maximum deceleration $a_{1\_max}$. In addition, when the preceding vehicle acceleration 110 is constant at the maximum deceleration $a_{1\_max}$, the relative acceleration 115 also becomes constant.

After that, as the host vehicle 1 starts decelerating, a host vehicle acceleration 111 that is the acceleration of the host vehicle 1 increases in the decelerating direction, that is, the upward direction in FIG. 4. In this way, as the host vehicle acceleration 111 increases when the preceding vehicle acceleration 110 is constant, a difference in acceleration between the host vehicle 1 and the preceding vehicle 100 starts decreasing, so the relative acceleration 115 that has been constant starts decreasing. Furthermore, when the host vehicle acceleration 111 increases and then the host vehicle acceleration 111 becomes equal to the preceding vehicle acceleration 110, the relative acceleration 115 becomes 0.

At the time of deceleration of the preceding vehicle 100, the acceleration of the host vehicle 1 and the acceleration of the preceding vehicle 100 vary in this way. The inter-vehicle distance at the time of deceleration of the preceding vehicle 100 will be described on the basis of the variations in the accelerations. When the preceding vehicle 100 decelerates, the host vehicle 1 decelerates after a delay of deceleration as described above from the deceleration of the preceding vehicle 100. Therefore, the relative acceleration 115 increases. When the relative acceleration 115 increases, the relative speed also varies. That is, when the host vehicle 1 has not started decelerating, the speed of the preceding vehicle 100 decreases with respect to the speed of the host vehicle 1 of which the vehicle speed is constant, so the relative speed increases. By so doing, the inter-vehicle distance between the host vehicle 1 and the preceding vehicle 100 reduces with a lapse of time.

Even when the host vehicle 1 starts decelerating, an increase in the relative speed continues until the deceleration of the host vehicle 1 becomes equal to the deceleration of the preceding vehicle 100. Therefore, after deceleration of the preceding vehicle 100, the relative speed continues to increase until the deceleration of the host vehicle 1 becomes equal to the deceleration of the preceding vehicle 100, and, when the deceleration of the host vehicle 1 is equal to the deceleration of the preceding vehicle 100, the relative speed is constant. When the deceleration of the host vehicle 1 is equal to the deceleration of the preceding vehicle 100, the relative speed is constant in this way; however, a speed difference still continues to exist, so the inter-vehicle distance between both vehicles continues to reduce even when the decelerations are equal to each other.

Figure 5:
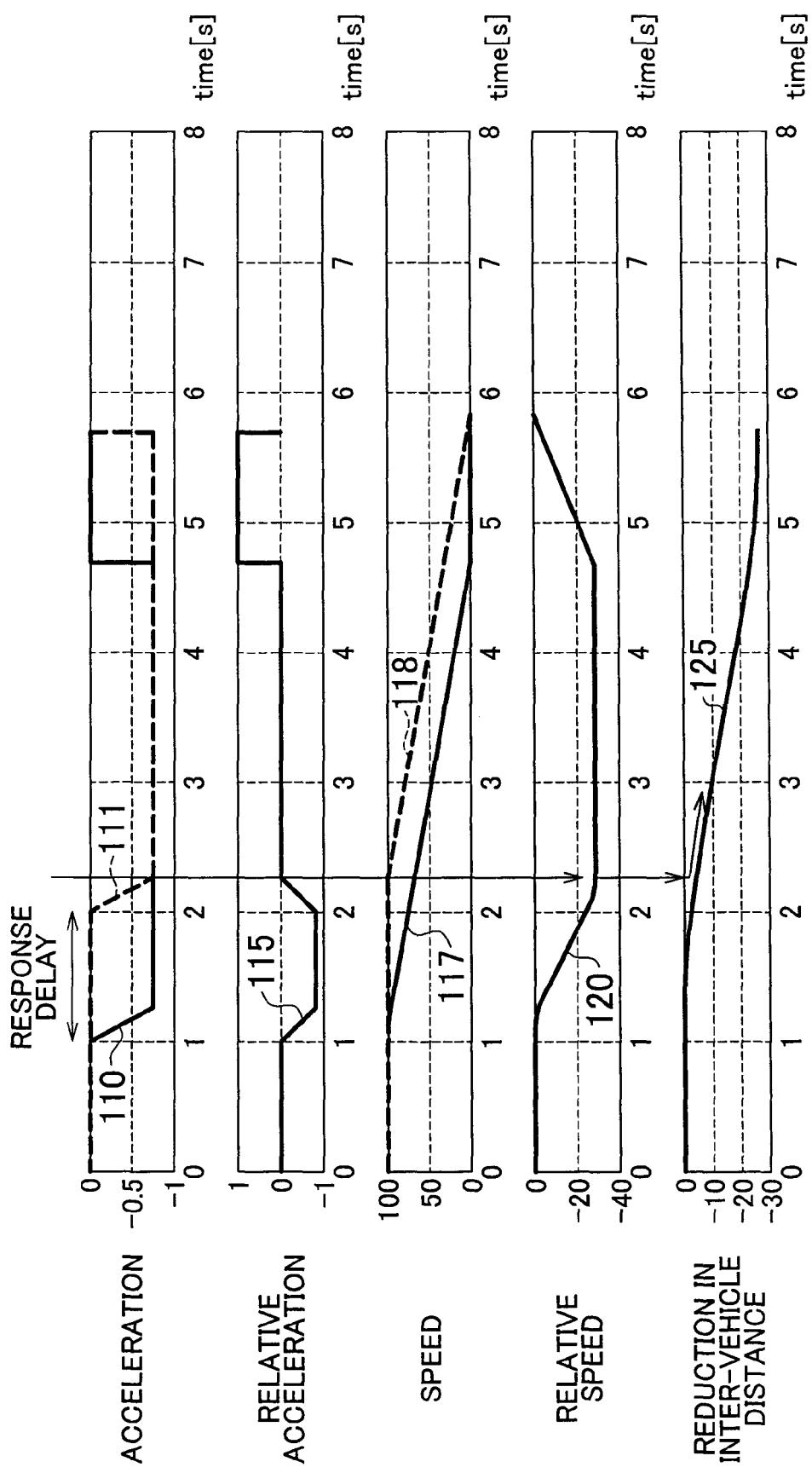
FIG. 5 is a time chart that illustrates a case where the host vehicle decelerates after a delay from the start of deceleration of the preceding vehicle according to the embodiment of the invention.

Next, a variation in inter-vehicle distance between the preceding vehicle 100 and the host vehicle 1 at the time of deceleration will be described. FIG. 5 is a time chart that illustrates a state where the host vehicle decelerates after a delay from the start of deceleration of the preceding vehicle. Note that FIG. 5 is a time chart that illustrates a state where the vehicle speeds $V_0$ before deceleration are 100 km/h, the deceleration $a_1$ is 0.8 G and the response delay dt of the host vehicle 1 with respect to deceleration of the preceding vehicle 100 is 1 s. When the host vehicle 1 is running a predetermined inter-vehicle distance behind the preceding vehicle 100 at substantially the same vehicle speed, as the preceding vehicle 100 starts decelerating and then the preceding vehicle acceleration 110 increases in the decelerating direction, the relative acceleration 115 of the preceding vehicle 100 with respect to the host vehicle 1 increases in the decelerating direction with respect to the host vehicle 1. In addition, in this example, the case where the deceleration is 0.8 G is described, so, after the deceleration of the preceding vehicle acceleration 110 increases to 0.8 G, the preceding vehicle 100 continues to decelerate at a deceleration of 0.8 G. Therefore, the relative acceleration 115 is constant for a predetermined period of time after the preceding vehicle acceleration 110 reaches 0.8 G.

In addition, when the preceding vehicle 100 starts decelerating and is decelerating at a deceleration in this way, a preceding vehicle speed 117 decreases with a lapse of time; whereas, when the host vehicle 1 is not decelerating, the relative speed 120 of the preceding vehicle 100 with respect to the host vehicle 1 increases in the direction in which the speed of the preceding vehicle 100 decreases with respect to the speed of the host vehicle 1. Thus, the inter-vehicle distance 125 between the host vehicle 1 and the preceding vehicle 100 reduces with a lapse of time.

As the preceding vehicle 100 decelerates in this way, the inter-vehicle distance 125 between the preceding vehicle 100 and the host vehicle 1 reduces. As the host vehicle 1 starts decelerating after a lapse of the response delay time dt, the host vehicle acceleration 111 also increases in the decelerating direction as in the case of the preceding vehicle acceleration 110. By so doing, the difference between the preceding vehicle acceleration 110 and the host vehicle acceleration 111 reduces, the relative acceleration 115 of the preceding vehicle 100, which has increased in the decelerating direction with respect to the host vehicle 1, decreases. In addition, in this example, after the host vehicle acceleration 111, as well as the preceding vehicle acceleration 110, increases to 0.8 G, the host vehicle 1 continues to decelerate at a deceleration of 0.8 G, so, after the host vehicle acceleration 111 reaches 0.8 G, the host vehicle acceleration 111 is constant at 0.8 G. In this case, there is no difference between the host vehicle acceleration 111 and the preceding vehicle acceleration 110, so the relative acceleration 115 becomes 0.

In addition, as the host vehicle 1 starts decelerating, host vehicle speed 118 decreases and, as a result, a variation in the relative speed 120 becomes gentle, and, when the host vehicle acceleration 111 becomes constant, the relative speed 120 is also constant. Even when the preceding vehicle acceleration 110 and the host vehicle acceleration 111 both are the same at 0.8 G and the relative acceleration 115 is 0, both the preceding vehicle speed 117 and the host vehicle speed 118 decrease and the relative speed 120 is kept constant because of a response delay of deceleration of the host vehicle 1 with respect to deceleration of the preceding vehicle 100. Therefore, the inter-vehicle distance 125 reduces with a lapse of time.

In this state, as both the preceding vehicle 100 and the host vehicle 1 decelerate at the same deceleration, the preceding vehicle 100 that has first started decelerating stops first and then the host vehicle 1 stops. In this way, in a state where the vehicle speeds $V_0$ before deceleration are 100 km/h, the deceleration $a_1$ is 0.8 G and the response delay dt of the host vehicle 1 with respect to deceleration of the preceding vehicle 100 is 1 s, when both the preceding vehicle 100 and the host vehicle 1 continue to decelerate until they stop, a reduced inter-vehicle distance 125 is about 27.7 m. The distance is a value obtained by multiplying the vehicle speed $V_0$ before deceleration (=100 km/h) by the response delay dt (=1 s).

Figure 6:
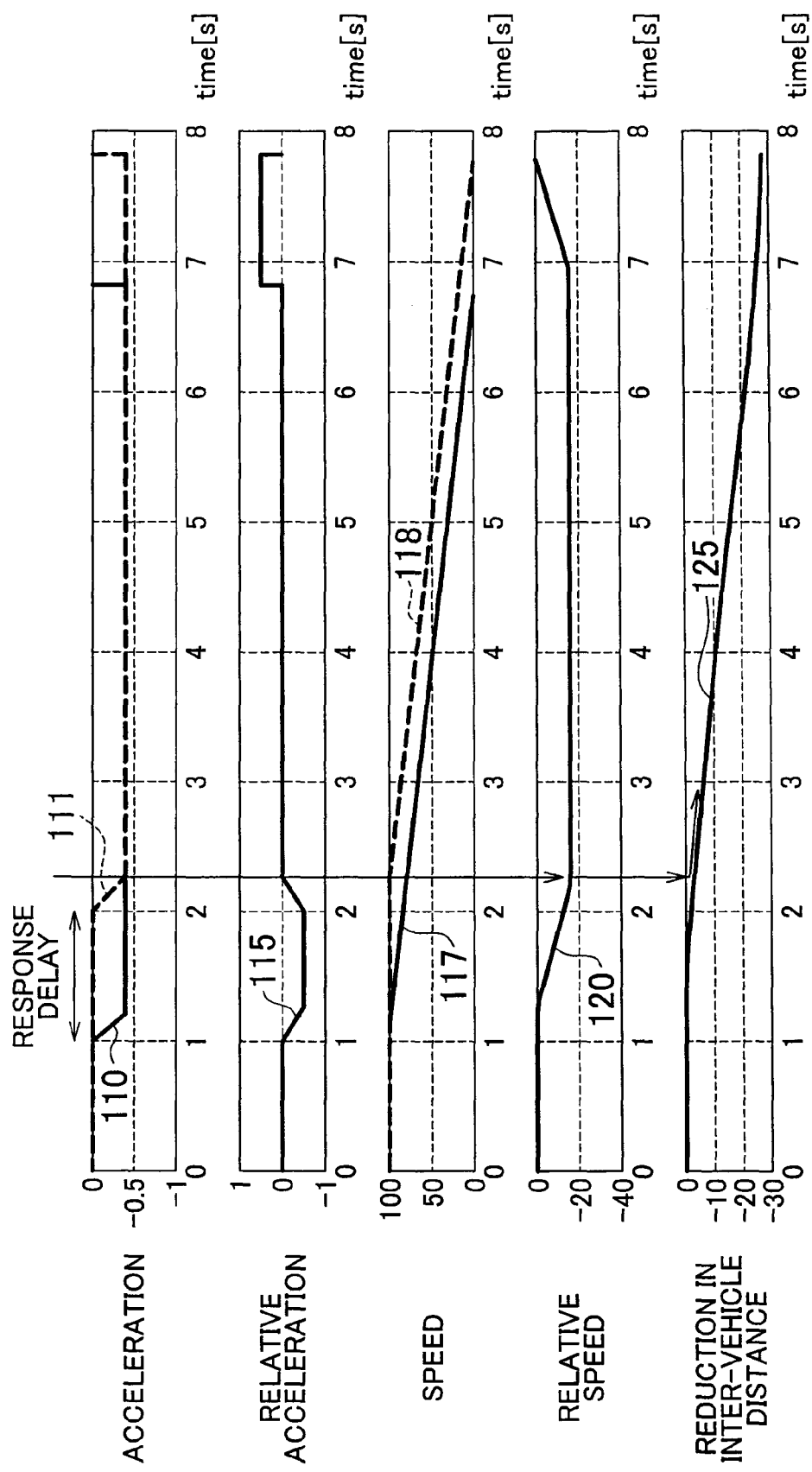
FIG. 6 is a time chart that illustrates a case where the host vehicle and the preceding vehicle decelerate at a deceleration smaller than that of the deceleration illustrated in FIG. 5.

FIG. 6 is a time chart that illustrates a state where the host vehicle and the preceding vehicle decelerate at a deceleration smaller than that of the deceleration illustrated in FIG. 5. FIG. 6 is a time chart that illustrates a state where the vehicle speeds $V_0$ before deceleration are 100 km/h and the response delay dt of the host vehicle 1 with respect to deceleration of the preceding vehicle 100 is 1 s, as in the case at the time of the deceleration illustrated in FIG. 5, but the deceleration $a_1$ is 0.4 G. In this way, in the case where both vehicles decelerate at a deceleration of 0.4 G as well, as the preceding vehicle 100 decelerates, the deceleration of the preceding vehicle 100 increases until the preceding vehicle acceleration 110 reaches 0.4 G, and, after the preceding vehicle acceleration 110 reaches 0.4 G, the preceding vehicle 100 continues to decelerate at a deceleration of 0.4 G. In addition, in the case where the preceding vehicle 100 decelerates and the host vehicle 1 is not decelerating yet, the relative acceleration 115 increases in the decelerating direction as the preceding vehicle acceleration 110 increases in the decelerating direction, and, after the preceding vehicle acceleration 110 reaches 0.4 G at the decelerating side, the deceleration is kept for a predetermined period of time at a magnitude smaller at the decelerating side than that in the case of 0.8 G.

In addition, when the preceding vehicle 100 decelerates at a deceleration of 0.4 G in this way, the preceding vehicle speed 117 decreases at a slope that is gentler than that when the deceleration is 0.8 G. Therefore, when the host vehicle 1 is not decelerating, the relative speed 120 of the preceding vehicle 100 with respect to the host vehicle 1 increases in the deceleration direction at a slope that is gentler than that when the deceleration is 0.8 G. Thus, the inter-vehicle distance 125 between the host vehicle 1 and the preceding vehicle 100 reduces with a lapse of time at a slope gentler than that when the deceleration is 0.8 G.

In this way, when the host vehicle 1 starts decelerating after a lapse of the response delay dt from when the preceding vehicle 100 starts decelerating, the host vehicle acceleration 111 also increases to 0.4 G at the decelerating side as in the case of the preceding vehicle acceleration 110, and the host vehicle acceleration 111 becomes constant at 0.4 G after reaching the 0.4 G at the decelerating side. By so doing, the relative acceleration 115 becomes 0.

In addition, when the host vehicle 1 starts decelerating and then the host vehicle acceleration 111 becomes constant, the relative speed 120 is also constant as in the case where the deceleration is 0.8 G. In addition, in this way, when both vehicles decelerate at a deceleration of 0.4 G as well, as in the case where both vehicles decelerate at a deceleration of 0.8 G, the relative speed 120 is kept constant because of the response delay of deceleration of the host vehicle 1 with respect to deceleration of the preceding vehicle 100 even when the relative acceleration 115 is 0, and the inter-vehicle distance 125 reduces with a lapse of time.

In this state, both the preceding vehicle 100 and the host vehicle 1 continue to decelerate until they stop, the reduced inter-vehicle distance 125 is about 27.7 m as in the case where the deceleration is 0.8 G. That is, when the initial speed of the preceding vehicle 100 and the initial speed of the host vehicle 1 are the same and the decelerations of the vehicles at the time of deceleration are the same, the reduced inter-vehicle distance 125 depends on the response delay irrespective of the decelerations.

The reduced inter-vehicle distance 125 at the time of deceleration is the same when the initial speeds and decelerations of the preceding vehicle 100 and host vehicle 1 are the same irrespective of the decelerations in this way; however, the initial speeds of the preceding vehicle 100 and host vehicle 1 influence the reduced inter-vehicle distance 125 at the time of deceleration. Next, the case where the initial speeds of the preceding vehicle 100 and host vehicle 1 are different from each other will be described.

Figure 7:
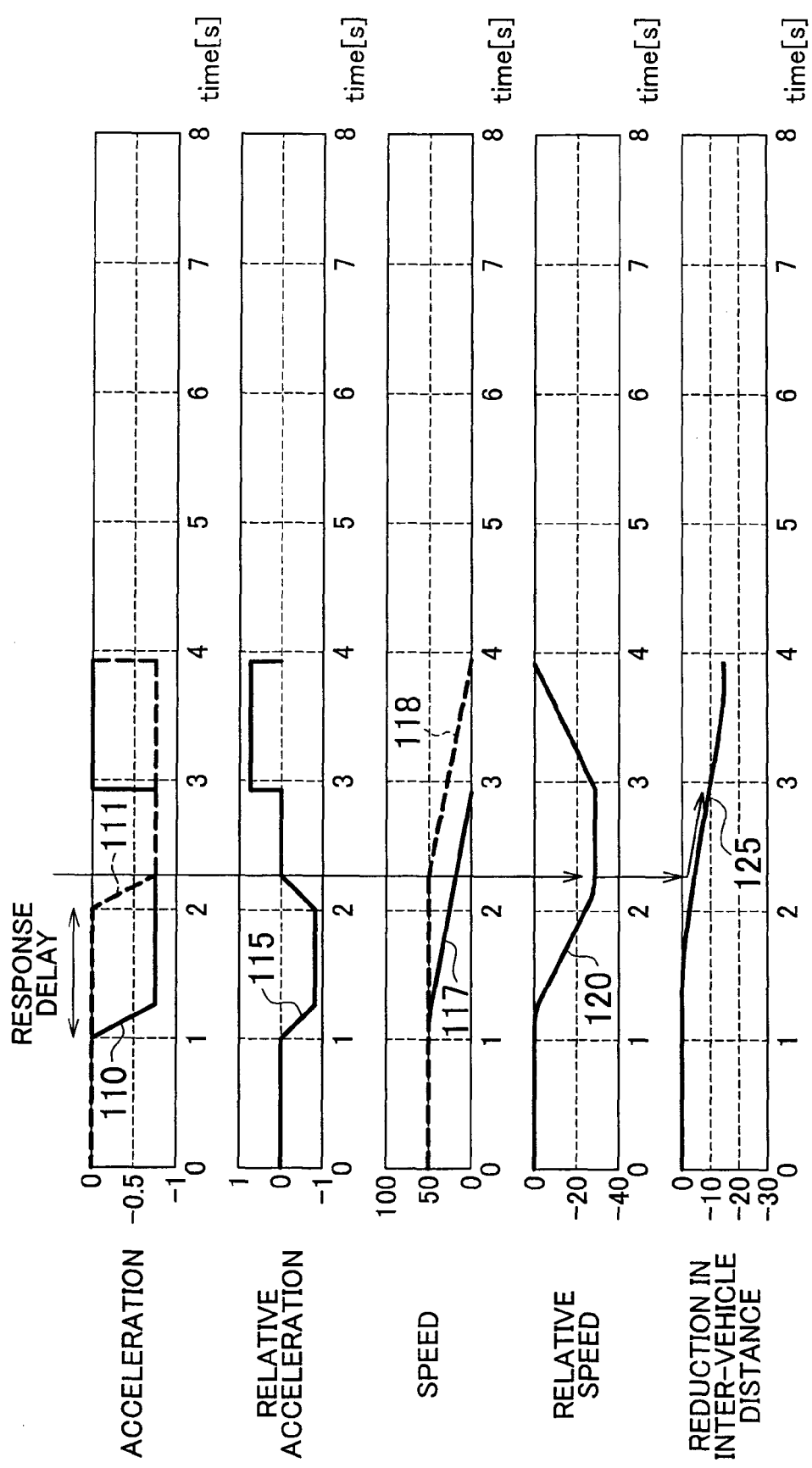
FIG. 7 is a time chart that illustrates a case where an initial speed is lower than that of the deceleration illustrated in FIG. 5.

FIG. 7 is a time chart that illustrates the case where the initial speeds of the preceding vehicle 100 and host vehicle 1 are lower than those of the deceleration illustrated in FIG. 5. FIG. 7 is a time chart that illustrates a state where the deceleration $a_1$ at the time of deceleration is 0.8 G and the response delay dt of the host vehicle 1 with respect to deceleration of the preceding vehicle 100 is 1 s as in the case at the time of the decelerating illustrated in FIG. 5 but the vehicle speeds $V_0$ before deceleration are 50 km/h.

Even when the vehicle speeds before deceleration are low in this way, when both vehicles decelerate at a deceleration of 0.8 G, the preceding vehicle acceleration 110 and the host vehicle acceleration 111 vary at the same slope as that in the case where the vehicle speeds before deceleration are 100 km/h, and the relative acceleration 115 also varies in the same manner as the case where the vehicle speeds before deceleration are 100 km/h. Thus, the preceding vehicle speed 117 and the host vehicle speed 118 vary in the same manner as those in the case where the vehicle speeds before deceleration are 100 km/h, so the relative speed 120 and the inter-vehicle distance 125 also vary in the same manner as those in the case where the vehicle speeds before deceleration are 100 km/h.

However, when the speed before deceleration is 50 km/h, the distance from a position at which the vehicle starts decelerating to a position at which the vehicle stops reduces, so the reduced inter-vehicle distance 125 reduces. That is, when the host vehicle 1 decelerates with a response delay from when the preceding vehicle 100 starts decelerating, the rate of variation in the inter-vehicle distance 125 is equal to that when the speeds before deceleration are 100 km/h; however, the initial speeds are low when the speeds before deceleration are 50 km/h, so a time from when the vehicle starts decelerating to when the vehicle stops is reduced. Therefore, the reduced inter-vehicle distance 125 at the time of decelerating is reduced, and, specifically, the reduced inter-vehicle distance 125 is about 13.9 m that is obtained by multiplying the vehicle speed $V_0$ before deceleration (=50 km/h) by the response delay dt (=1 s).

As described above, when the host vehicle 1 decelerates at the same deceleration as that of the preceding vehicle 100, the reduced inter-vehicle distance 125 is obtained by multiplying the response delay time by the initial speed irrespective of a deceleration at the time of deceleration. Therefore, irrespective of a deceleration, the reduced inter-vehicle distance 125 reduces as the response delay time reduces, and, when the response delay time is 0 s, that is, when the host vehicle 1 is able to decelerate in synchronization with the preceding vehicle 100, the inter-vehicle distance 125 after deceleration is a distance indicated by the same inter-vehicle time as the inter-vehicle time before deceleration.

In the case where the host vehicle 1 is running behind the preceding vehicle 100, when the preceding vehicle 100 decelerates and, therefore, the host vehicle 1 also decelerates, the reduced inter-vehicle distance 125 is significantly influenced by the response delay time in this way. Next, a decelerating state where it is possible to reduce the possibility of occurrence of a rear-end collision when the preceding vehicle 100 and the host vehicle 1 decelerate will be described.

Figure 8:
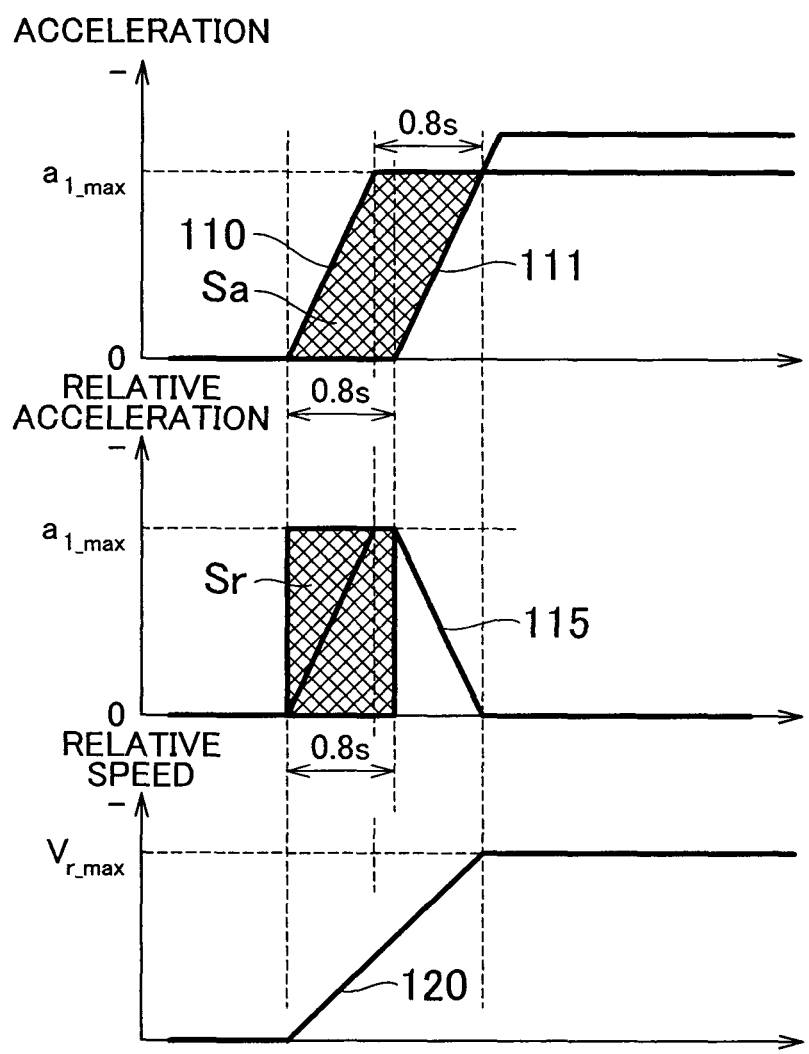
FIG. 8 is a time chart that illustrates the correlation among the acceleration of the host vehicle, the acceleration of the preceding vehicle and the relative acceleration and relative speed of the preceding vehicle with respect to the host vehicle at the time of deceleration according to the embodiment of the invention.

FIG. 8 is a time chart that illustrates the correlation among the acceleration of the host vehicle, the acceleration of the preceding vehicle, the relative acceleration and the relative speed at the time of deceleration. A complex phenomenon at the time of deceleration will be described in a simple abstraction. When the preceding vehicle 100 and the host vehicle 1 decelerate, the host vehicle 1 responds after the same response time as the inter-vehicle time after deceleration of the preceding vehicle 100 to decelerate at a deceleration that is larger than or equal to the deceleration of the preceding vehicle 100. By so doing, it is possible to reduce the possibility of occurrence of a rear-end collision. For example, in the case where the inter-vehicle time is 0.8 s, after the preceding vehicle 100 starts decelerating, the host vehicle 1 starts decelerating after a delay of 0.8 s, and decelerates at a deceleration larger than or equal to the deceleration of the preceding vehicle 100. By so doing, the host vehicle 1 is able to reduce the possibility that the host vehicle 1 hits the rear end of the preceding vehicle 100.

That is, when the jerk, which is the rate of variation in deceleration with respect to an elapsed time, is equal between the preceding vehicle 100 and the host vehicle 1, it is possible to reduce the possibility of occurrence of a rear-end collision if the relationship between a response time $t_{delay}$, which is the response delay time of the host vehicle 1 to braking of the preceding vehicle 100, and a set inter-vehicle time τ satisfies ($t_{delay} \leq \tau$). That is, when the relative speed caused by a response delay is brought to fall below a certain value, it is possible to reduce the possibility of occurrence of a rear-end collision.

The case where reduction in the possibility of occurrence of a rear-end collision at the time of deceleration is considered in terms of the relative speed will be described. First, when the jerk of the deceleration is equal between the host vehicle 1 and the preceding vehicle 100, the preceding vehicle acceleration 110 that indicates the deceleration at the time of deceleration of the preceding vehicle 100 and the host vehicle acceleration 111 that indicates the deceleration at the time of deceleration of the host vehicle 1 have the same slope against an elapsed time.

Therefore, when the preceding vehicle acceleration 110 and the host vehicle acceleration 111 have the same jerk, and the maximum value of the host vehicle acceleration 111 is larger than a preceding vehicle maximum deceleration $a_{1\_max}$ that is the maximum value of the preceding vehicle acceleration 110, the total amount of difference in acceleration due to a response delay time when the host vehicle acceleration 111 occurs after a delay of the response time $t_{delay}$ with respect to the preceding vehicle acceleration 110 may be indicated by the area $S_a$ of the parallelogram surrounded by the inclined portion of the preceding vehicle acceleration 110, the inclined portion of the host vehicle acceleration 111, the preceding vehicle maximum deceleration $a_{1\_max}$ and the minimum value (0) of the deceleration.

Where the total amount of the difference in acceleration (deceleration) is denoted by the relative acceleration, when the preceding vehicle 100 starts decelerating and the host vehicle 1 has not started decelerating yet because of a response delay, the maximum value of the relative acceleration is the preceding vehicle maximum deceleration $a_{1\_max}$. In addition, when the response delay time of the host vehicle 1 occurs at the time of deceleration of the preceding vehicle 100, the preceding vehicle maximum deceleration $a_{1\_max}$ continuously occurs as the relative acceleration during the response delay time, that is, during the response time $t_{delay}$. Therefore, the total amount of relative acceleration due to the response delay time is a value obtained by multiplying the preceding vehicle maximum deceleration $a_{1\_max}$ by the response time $t_{delay}$, and may be indicated by the area $S_r$ of the portion surrounded by the preceding vehicle maximum deceleration $a_{1\_max}$ and the response time $t_{delay}$.

As described above, the total amount of acceleration and the total amount of relative acceleration in the case where there occurs a response delay may be indicated by the area $S_a$ of the parallelogram of the accelerations and the area $S_r$ of the relative acceleration, and these areas may be calculated by multiplying the preceding vehicle maximum deceleration $a_{1\_max}$ by the response time $t_{delay}$. In addition, in order to reduce the possibility of occurrence of a rear-end collision when the host vehicle 1 decelerates after the preceding vehicle 100 starts decelerating, it is only necessary that the relationship between the response time $t_{delay}$ and the set inter-vehicle time $\tau$ satisfies $(t_{delay} \leq \tau)$, so, when these are organized, the requirements may be expressed by the following mathematical expression (1).

$$S_r(\text{relative acceleration area}) = S_a(\text{area of parallelogram}) \leq \tau(\text{set inter-vehicle time}) \cdot a_{1\_max}(\text{preceding vehicle maximum deceleration}) \quad (1)$$

In addition, the relative acceleration area $S_r$ is the total amount of acceleration during the response time $t_{delay}$, and, in other words, the relative acceleration area $S_r$ indicates the relative speed $V_r$ of the preceding vehicle 100 with respect to the host vehicle 1 after a lapse of the response time $t_{delay}$. In addition, when the jerk of deceleration is equal between the preceding vehicle 100 and the host vehicle 1, the relationship $\{t_{delay}(\text{response time}) \leq \tau(\text{set inter-vehicle time})\}$ just needs to be satisfied in order to reduce the possibility of occurrence of a rear-end collision, so, where the maximum value of the relative speed at which the host vehicle 1 is located a distance immediately before hitting the rear end of the preceding vehicle 100 is denoted by $V_{r\_max}$, the maximum value $V_{r\_max}$ of the relative speed is a value obtained by multiplying the set inter-vehicle time $\tau$ by the preceding vehicle maximum deceleration $a_{1\_max}$ at the time when the preceding vehicle 100 and the host vehicle 1 end decelerating. Therefore, when the relative speed $V_r$ that occurs because of the response delay of the host vehicle 1 is caused to fall at or below the maximum value $V_{r\_max}$ of the relative speed as expressed by the following mathematical expression (2), it is possible to reduce the possibility of occurrence of a rear-end collision.

$$V_r(\text{relative speed}) \leq V_{r\_max} = \tau(\text{set inter-vehicle time}) \cdot a_{1\_max}(\text{preceding vehicle maximum deceleration}) \quad (2)$$

The mathematical expression (2) is the condition that the possibility of occurrence of a rear-end collision is reduced not only in the initial phase of braking but also in a braking steady range. Therefore, when the preceding vehicle 100 decelerates, even when the initial phase of braking of the host vehicle 1 delays, braking that eventually satisfies the mathematical expression (2) is performed to thereby make it possible to reduce the possibility where the host vehicle 1 hits the rear end of the preceding vehicle 100. That is, after the initial phase of braking as well, the radar 12 is used to execute appropriate feedback control by, for example, detecting the relative speed of the preceding vehicle 100 to perform braking that eventually satisfies the mathematical expression (2). By so doing, it is possible to ensure a time for executing control for reducing the possibility of occurrence of a rear-end collision.

FIG. 9 is a time chart that illustrates the acceleration of the preceding vehicle and the acceleration of the host vehicle at the time of deceleration during follow-up running control. When the host vehicle 1 is caused to decelerate after the preceding vehicle 100 starts decelerating, the response delay of the host vehicle 1 is significantly involved as described above, so, when the possibility of occurrence of a rear-end collision is reduced at the time when the host vehicle 1 runs behind the preceding vehicle 100, it is necessary that the host vehicle 1 runs in consideration of the response delay of the host vehicle 1. Next, the case where the inter-vehicle time is set in consideration of a response delay at the time of deceleration will be described. For example, during follow-up running control with the inter-vehicle time of 0.8 s, when the preceding vehicle 100 suddenly brakes, the response delay is about a communication delay (0.1 s) in communication follow-up running control, so the host vehicle 1 is able to decelerate at substantially the same timing as that when the preceding vehicle 100 decelerates. Therefore, in communication follow-up running control, it is possible to start braking sufficiently early while follow-up running is carried out with the inter-vehicle time of 0.8 s.

In addition, in the case where autonomous follow-up running control is executed because of a communication breakdown during communication follow-up running, when the host vehicle decelerates at a deceleration larger than or equal to the deceleration of the preceding vehicle 100 within 0.8 s that is the set inter-vehicle time, it is possible to reduce the possibility where the host vehicle 1 hits the rear end of the preceding vehicle 100. During autonomous follow-up running control, the deceleration of the preceding vehicle 100 is estimated on the basis of the result detected by the radar 12, and the host vehicle 1 decelerates at the estimated deceleration within 0.8 s to thereby make it possible to reduce the possibility of occurrence of a rear-end collision.

In addition, during follow-up running at a steady speed, the initial relative speed is 0; however, in the case of catching up, cutting in, or the like, there is an initial relative speed. For example, when the vehicle speed of the preceding vehicle 100 at the time when the preceding vehicle 100 starts decelerating is 80 km/h and the vehicle speed of the host vehicle 1 at that time is 100 km/h, the initial relative speed is 20 km/h. Control that is able to reduce the possibility of occurrence of a rear-end collision even when the preceding vehicle 100 rapidly decelerates in the case where there is an initial relative speed in this way will be described. An equivalent response time, by which the sum of a relative speed due to a response delay that occurs between the vehicles and an initial relative speed is equal to a relative speed margin present between the vehicles, is defined. When the host vehicle 1 is caused to decelerate, the deceleration is controlled so that the equivalent response time does not exceed the set inter-vehicle time.

FIG. 10 is a view that illustrates the equivalent response time. The equivalent response time will be described. Where the sum of the area of a parallelogram and a value corresponding to the initial relative speed $V_{r0}$ is equal to the relative acceleration area $S_r$ (see FIG. 8) and the height of the parallelogram is equal to the preceding vehicle maximum deceleration $a_{1\_max}$, the length of the base of the parallelogram is an equivalent response time x. The relative acceleration area $S_r$ is a value obtained by multiplying the preceding vehicle maximum deceleration $a_{1\_max}$ by the set inter-vehicle time $\tau$, so these are expressed by the following mathematical expression (3).

$$a_{1\_max}x + V_{r0} = a_{1\_max}\tau \tag{3}$$

When the mathematical expression (3) is modified into the mathematical expression that gives the equivalent response time x, the following mathematical expression (4) is obtained.

$$x = \tau - (V_{r0}/a_{1\_max}) \tag{4}$$

As is apparent from the mathematical expression (4), the host vehicle 1 is cause to decelerate at a deceleration that is larger than or equal to the deceleration of the preceding vehicle 100 within a period of time that is obtained by subtracting a time corresponding to the initial relative speed $V_{r0}$ from the set inter-vehicle time $\tau$ to thereby make it possible to reduce the possibility that the host vehicle 1 hits the rear end of the preceding vehicle 100 even when there is the initial relative speed $V_{r0}$ at the time of deceleration of the preceding vehicle 100.

In addition, the equivalent response time x is a time that is compared with the set inter-vehicle time $\tau$ to be able to execute control for reducing the possibility that the host vehicle 1 hits the rear end of the preceding vehicle 100, so the equivalent response time x may be handled as in the case of the response time $t_{delay}$ when there is no initial relative speed $V_{r0}$. That is, even when there is the initial relative speed $V_{r0}$, by converting the initial relative speed $V_{r0}$ into the equivalent response time x, the equivalent response time x is handled so that the equivalent response time x is regarded as $t_{delay}$ as in the case where there is no initial relative speed $V_{r0}$, and the equivalent response time that satisfies $\{t_{delay}(\text{equivalent response time}) \leq \tau(\text{set inter-vehicle time})\}$ is derived to thereby make it possible to execute braking control by which the possibility of occurrence of a rear-end collision is reduced.

In addition, the braking response characteristic during braking varies depending on a vehicle, so the host vehicle 1 may not be able to decelerate at a deceleration larger than or equal to the deceleration of the preceding vehicle 100. In this case as well, an inter-vehicle time is set by converting the response delay into an equivalent response time, and the deceleration is generated within the set inter-vehicle time. Specifically, the inter-vehicle communication device 15 is used to communicate the braking response characteristic between the preceding vehicle 100 and the host vehicle 1, the equivalent response time is calculated so that the relative speed due to a delay that occurs between the vehicles having different braking response characteristics is the same, the host vehicle 1 decelerates at a deceleration at which it is possible to reduce the possibility of occurrence of a rear-end collision at any vehicle speed or acceleration, including the brake performance, the response speed during braking and, further, an individual difference in brake characteristic, such as the characteristic of the vehicle during braking.

Figure 11:
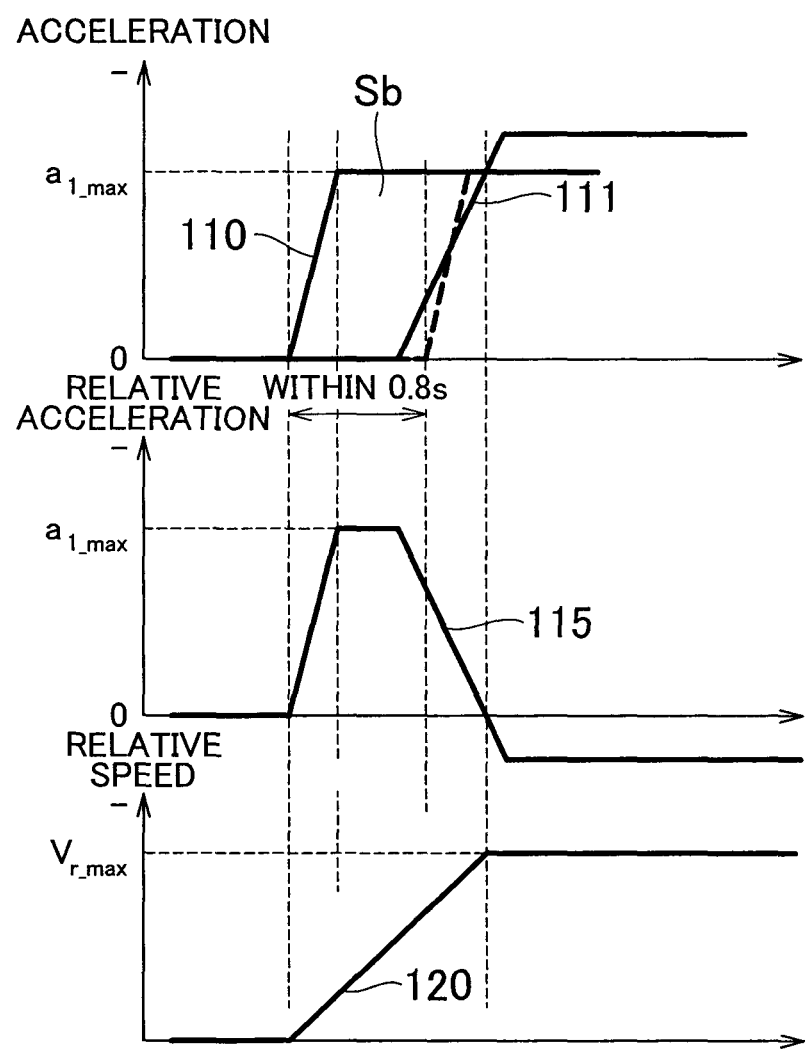
FIG. 11 is a time chart that illustrates the correlation among the acceleration of the preceding vehicle, the acceleration of the host vehicle and the relative acceleration and relative speed of the preceding vehicle with respect to the host vehicle in the case where the maximum jerks of the preceding vehicle and host vehicle at the time of deceleration are different from each other according to the embodiment of the invention.

FIG. 11 is a time chart that illustrates the correlation among the acceleration of the preceding vehicle, the acceleration of the host vehicle, the relative acceleration and relative speed of the preceding vehicle with respect to the host vehicle in the case where the maximum jerks of the preceding vehicle and host vehicle at the time of deceleration are different from each other. As an example of the case where the braking response characteristic is different between the preceding vehicle 100 and the host vehicle 1, the case where the rate of variation in deceleration, that is, the deceleration jerk, against an elapsed time is larger in the preceding vehicle 100 than in the host vehicle 1 will be described. Note that, in the following description, a state where a variation in deceleration against an elapsed time is large is expressed as the deceleration jerk is large, and a state where a variation in deceleration against an elapsed time is relatively small and a variation is gentle is expressed as the deceleration jerk is small.

Inter-vehicle communication is carried out with the preceding vehicle 100, and, when the maximum deceleration jerk of the preceding vehicle 100, among the pieces of the running information of the preceding vehicle 100 acquired by the preceding vehicle running information acquisition unit 45, is larger than the maximum deceleration jerk of the host vehicle 1, that is, the maximum deceleration jerk of the host vehicle 1 is smaller than the maximum deceleration jerk of the preceding vehicle 100, the host vehicle acceleration 111 varies in deceleration more gently with respect to an elapsed time than the preceding vehicle acceleration 110. Therefore, as for the relative acceleration 115 when the preceding vehicle 100 starts decelerating and then the host vehicle 1 decelerates after a lapse of the response time of the host vehicle 1, the rate of variation in the relative acceleration 115 that reduces because of the deceleration of the host vehicle 1 after the host vehicle 1 starts decelerating is smaller than the rate of variation in the relative acceleration 115 that increases because of the deceleration of the preceding vehicle 100 before the host vehicle 1 starts decelerating.

In addition, when the deceleration jerk of the host vehicle 1 is smaller than the deceleration jerk of the preceding vehicle 100 in this way, the total amount of difference in acceleration due to a response delay time in the case where the host vehicle acceleration 111 occurs after a delay of the response time from the preceding vehicle acceleration 110 may be indicated by the area $S_b$ of a trapezoid that is surrounded by the inclined portion of the preceding vehicle acceleration 110, the inclined portion of the host vehicle acceleration 111, the preceding vehicle maximum deceleration $a_{1\_max}$ and the minimum value (0) of the deceleration.

That is, the deceleration jerk of the host vehicle 1 is smaller than the deceleration jerk of the preceding vehicle 100, so a period of time from when the host vehicle 1 starts decelerating to when the host vehicle acceleration 111 becomes a deceleration equal to the preceding vehicle maximum deceleration $a_{1\_max}$ is longer than a period of time from when the preceding vehicle 100 starts decelerating to when the preceding vehicle acceleration 110 reaches the preceding vehicle maximum deceleration $a_{1\_max}$. Therefore, a period of time from when the preceding vehicle acceleration 110 reaches the preceding vehicle maximum deceleration $a_{1\_max}$ to when the host vehicle acceleration 111 becomes a deceleration equal to the preceding vehicle maximum deceleration $a_{1\_max}$ is longer than a response time from when the preceding vehicle 100 starts decelerating to when the host vehicle 1 starts decelerating.

Thus, the shape of the trapezoid that indicates the total amount of difference in acceleration due to the fact that the host vehicle 1 starts decelerating with a response time is formed so that a period of time from when the preceding vehicle acceleration 110 reaches the preceding vehicle maximum deceleration $a_{1\_max}$ to when the host vehicle acceleration 111 becomes a deceleration equal to the preceding vehicle maximum deceleration $a_{1\_max}$ is longer than the response time.

FIG. 12 is a view that illustrates an equivalent response time. The total amount of difference in acceleration due to the start of deceleration of the host vehicle 1 having a response time in the case where the deceleration jerk of the host vehicle 1 is smaller than the deceleration jerk of the preceding vehicle 100 may be expressed by the trapezoid shown in FIG. 11; however, when the deceleration jerks of the host vehicle 1 and preceding vehicle 100 are the same, the total amount of difference in acceleration may be indicated by the area $S_a$ of a parallelogram. In addition, in the case where the deceleration jerks of the host vehicle 1 and preceding vehicle 100 are the same in this way, when the host vehicle 1 is caused not to hit the rear end of the preceding vehicle 100 at the time of deceleration of the preceding vehicle 100, the response time is controlled so as to fall below the set inter-vehicle time.

Therefore, in the case where the deceleration jerk of the host vehicle 1 is smaller than the deceleration jerk of the preceding vehicle 100, when deceleration control is executed over the host vehicle 1 on the basis of a similar concept in order for the host vehicle 1 not to hit the rear end of the preceding vehicle 100 at the time of deceleration of the preceding vehicle 100, a parallelogram that has the same area as the area $S_b$ of the trapezoid indicating the total amount of difference in acceleration and that has a height of the preceding vehicle maximum deceleration $a_{1\_max}$ is set as an equivalent parallelogram 140. Furthermore, where the base of the equivalent parallelogram 140 is set to the equivalent response time $t_{delay}$, control over the host vehicle 1 is executed so that the equivalent response time $t_{delay}$ falls at or below the set inter-vehicle time $\tau$. Note that the equivalent response time $t_{delay}$ is longer than the response time that is the base of the original trapezoid.

That is, when the deceleration jerk of the host vehicle 1 is smaller than the deceleration jerk of the preceding vehicle 100, the equivalent parallelogram 140 having the same area as the area $S_b$ of the trapezoid that indicates the total amount of difference in acceleration between both vehicles is obtained, and the deceleration of the host vehicle 1 is adjusted so that the base of the equivalent parallelogram 140 satisfies the relationship between the equivalent response time $t_{delay}$ the set inter-vehicle time $\tau$ ($t_{delay} \leq \tau$). That is, when the deceleration jerk of the host vehicle 1 is smaller than the deceleration jerk of the preceding vehicle 100, control is executed so as to satisfy the relationship ($t_{delay} \leq \tau$) by changing the deceleration timing of the host vehicle 1 or the set inter-vehicle time so that the equivalent response time $t_{delay}$ falls within the set inter-vehicle time $\tau$.

For example, when the deceleration timing is changed to satisfy the relationship ($t_{delay} \leq \tau$) in the case where the deceleration jerk of the host vehicle 1 is smaller than the deceleration jerk of the preceding vehicle 100, the braking start timing at the time when the preceding vehicle 100 decelerates is advanced to thereby advance the deceleration timing of the host vehicle 1. In addition, when the set inter-vehicle time is changed to satisfy the relationship ($t_{delay} \leq \tau$) in the case where the deceleration jerk of the host vehicle 1 is smaller than the deceleration jerk of the preceding vehicle 100, the inter-vehicle time or inter-vehicle distance between the host vehicle 1 and the preceding vehicle 100 in follow-up running control is increased. By so doing, even when the deceleration jerk is different between the host vehicle 1 and the preceding vehicle 100, a similar method to that in deceleration control in the case where the deceleration jerk is the same between both vehicles is used to make it possible to execute deceleration control by which the possibility that the host vehicle 1 hits the rear end of the preceding vehicle 100 may be reduced at the time of deceleration of the preceding vehicle 100.

Note that the deceleration jerk of the preceding vehicle 100, which is used to set the deceleration timing of the host vehicle 1 or the inter-vehicle time, may be acquired by a manner other than inter-vehicle communication, and, for example, it is also applicable that the host vehicle 1 continuously performs follow-up running behind the preceding vehicle 100 while using the radar 12 to detect the running state of the preceding vehicle 100 and then the deceleration jerk of the preceding vehicle 100 is acquired through learning on the basis of the result detected by the radar 12. In addition, it is also applicable that the deceleration jerk acquired through inter-vehicle communication is used not only during communication follow-up running control but also during autonomous follow-up running control and, during autonomous follow-up running control, the deceleration jerk acquired through inter-vehicle communication is used to set the deceleration timing of the host vehicle 1 or the inter-vehicle time.

In addition, the deceleration jerk of the preceding vehicle 100, which is used to set the deceleration timing of the host vehicle 1 or the inter-vehicle time, may be not only the deceleration jerk of the preceding vehicle 100 that runs immediately ahead of the host vehicle 1 but also the deceleration jerk of a preceding vehicle that runs ahead of the preceding vehicle 100. When inter-vehicle communication is carried out, not only the running information of the preceding vehicle 100 immediately ahead of the host vehicle 1 but also the running information of vehicles within a predetermined range may be acquired. In addition, when three or more vehicles run in single file, the deceleration jerk of a preceding vehicle that runs further ahead of an immediately preceding vehicle also influences deceleration of the host vehicle 1, so the deceleration jerk of the preceding vehicle, other than the preceding vehicle 100 immediately ahead of the host vehicle 1, may be used to set the deceleration timing or the inter-vehicle time. In addition, the deceleration jerk acquired through inter-vehicle communication is desirably corrected where appropriate on the basis of the detected result of the running state of the preceding vehicle 100, detected by the radar 12, a road surface μ, and the like.

When the host vehicle 1 is caused to decelerate in synchronization with deceleration of the preceding vehicle 100, the deceleration of the preceding vehicle 100 and the inter-vehicle time are used to derive the deceleration of the host vehicle 1, which satisfies the above described mathematical expressions, and then decelerate the host vehicle 1 to thereby make it possible to reduce the possibility that the host vehicle 1 hits the rear end of the preceding vehicle 100. Next, control that is able to reduce the possibility that the host vehicle 1 hits the rear end of the preceding vehicle 100 using the above described conditions at the time of deceleration of the preceding vehicle 100 in follow-up running control will be specifically described separately in communication follow-up running control and in autonomous follow-up running control. First, in communication follow-up running control, in order to execute follow-up running control by acquiring the running information of the preceding vehicle 100 through inter-vehicle communication, when the preceding vehicle 100 decelerates, information about deceleration, such as the maximum deceleration jerk of the preceding vehicle 100, is also acquired. For example, when the driver of the preceding vehicle 100 performs braking operation on the brake pedal to decelerate the preceding vehicle 100, information about braking operation is acquired by the preceding vehicle running information acquisition unit 45. In addition, when the preceding vehicle 100 is executing drive assist control for the driver, such as when the preceding vehicle 100 is executing follow-up running control with respect to a further preceding vehicle, information about deceleration control when the preceding vehicle 100 is decelerated through drive assist control is acquired by the preceding vehicle running information acquisition unit 45. In addition, the preceding vehicle running information acquisition unit 45 also serves as a deceleration jerk acquisition unit that acquires the deceleration jerk information of the preceding vehicle 100. The preceding vehicle running information acquisition unit 45 acquires the deceleration jerk information of the preceding vehicle 100 and further acquires information about the maximum deceleration jerk from the deceleration jerk information.

The communication follow-up running control ECU 40, which has acquired the deceleration running information of the preceding vehicle 100 through inter-vehicle communication using the preceding vehicle running information acquisition unit 45, derives the maximum deceleration of the preceding vehicle 100 using the preceding vehicle maximum deceleration deriving unit 46 on the basis of the deceleration information acquired by the preceding vehicle running information acquisition unit 45. In the case where the maximum deceleration of the preceding vehicle 100 is derived by the preceding vehicle maximum deceleration deriving unit 46, for example, when information about braking operation is used as the deceleration information of the preceding vehicle 100, a deceleration that occurs through the braking operation of the driver is derived on the basis of the operation amount and operation speed at the time when the driver operates the brake pedal, and, in addition, the maximum deceleration when the braking operation is performed is derived by the preceding vehicle maximum deceleration deriving unit 46.

In addition, when information about deceleration control at the time when the preceding vehicle 100 is decelerated through drive assist control is used as the deceleration information of the preceding vehicle 100, the deceleration of the preceding vehicle 100 is acquired on the basis of a deceleration instructed by drive assist control and, in addition, the maximum deceleration at the time of issuance of the deceleration instruction is derived by the preceding vehicle maximum deceleration deriving unit 46. After the preceding vehicle maximum deceleration deriving unit 46 is used to derive the maximum deceleration of the preceding vehicle 100 at the time of deceleration of the preceding vehicle 100, the equivalent response time calculation unit 31 of the running control ECU 20 is used to calculate the equivalent response time on the basis of the maximum deceleration jerk of the host vehicle 1, the maximum deceleration of the preceding vehicle 100 and the maximum deceleration jerk of the preceding vehicle 100, acquired by the preceding vehicle running information acquisition unit 45. In addition, the equivalent response time and the preceding vehicle maximum deceleration, which is the maximum deceleration of the preceding vehicle 100 derived by the preceding vehicle maximum deceleration deriving unit 46 of the communication follow-up running control ECU 40, are transmitted to the running control ECU 20, and then the deceleration calculation unit 33 of the running control ECU 20 is used to calculate the deceleration of the host vehicle 1 on the basis of the equivalent response time and the preceding vehicle maximum deceleration.

When the deceleration calculation unit 33 is used to calculate the deceleration of the host vehicle 1, the deceleration of the host vehicle 1 is calculated on the basis of the inter-vehicle time set on the basis of the vehicle speed of the host vehicle 1 before deceleration. A variation in deceleration, that is, the rate of variation in deceleration against an elapsed time, is calculated so that the deceleration of the host vehicle 1 is equal to the deceleration of the preceding vehicle 100 at the point of a lapse of the inter-vehicle time. When the rate of variation in deceleration is calculated, it is calculated as a value that may be used to control a deceleration including a deceleration after the initial rising of the deceleration. Specifically, the set inter-vehicle time $\tau$ preset for communication follow-up running and the preceding vehicle maximum deceleration $a_{1\_max}$ that is the maximum deceleration of the preceding vehicle 100 derived by the preceding vehicle maximum deceleration deriving unit 46 are used to compute the above mathematical expression (2), that is, ($V_{r\_max} = \tau \cdot a_{1\_max}$), using the deceleration relative speed calculation unit 35 to thereby calculate the maximum value $V_{r\_max}$ of the relative speed. At this time, the deceleration jerk performance of the preceding vehicle 100 is compared with the deceleration jerk performance of the host vehicle 1, and, when the deceleration jerk performance of the preceding vehicle 100 is higher than the deceleration jerk performance of the host vehicle 1, the maximum value $V_{r\_max}$ of the relative speed is calculated so that the timing at which the host vehicle 1 is decelerated by the communication follow-up running control ECU 40 in response to deceleration of the preceding vehicle 100 is advanced as compared with the case where the deceleration jerk performance of the preceding vehicle 100 is lower than the deceleration jerk performance of the host vehicle 1.

In this way, when the timing at which the host vehicle 1 is decelerated is advanced, the set inter-vehicle time $\tau$ is compared with the equivalent response time $t_{delay}$ calculated by the equivalent response time calculation unit 31, and then the deceleration timing is advanced until the deceleration jerk performance of the host vehicle 1 is able to satisfy the relationship (equivalent response time $t_{delay} \leq$ set inter-vehicle time $\tau$). By so doing, a value that may be used to control the deceleration of the host vehicle 1, including a deceleration after the initial rising of the deceleration, is calculated. That is, the maximum value $V_{r\_max}$ of the relative speed is a value that can achieve a variation in deceleration required to change the deceleration at the time when the host vehicle 1 is decelerated to a deceleration equal to the deceleration of the preceding vehicle 100 at the point of a lapse of the inter-vehicle time from a current vehicle speed.

In addition, the deceleration calculation unit 32 serves as a deceleration timing control unit by which the communication follow-up running control ECU 40 changes the timing at which the host vehicle 1 is decelerated in response to deceleration of the preceding vehicle 100 on the basis of the deceleration jerk information of the preceding vehicle 100. Furthermore, the deceleration calculation unit 32 also serves as a deceleration timing advance unit that advances the deceleration timing of the host vehicle 1 when the deceleration jerk performance of the preceding vehicle 100 is higher than the deceleration jerk performance of the host vehicle 1 as compared with when the deceleration jerk performance of the preceding vehicle 100 is lower than the deceleration jerk performance of the host vehicle 1. The deceleration calculation unit 32 is used to change the deceleration timing on the basis of deceleration jerk information in this way to thereby calculate a deceleration in consideration of the deceleration jerk performance of the host vehicle 1 and the deceleration jerk performance of the preceding vehicle 100.

In contrast to this, when autonomous follow-up running control is executed, the autonomous follow-up running control ECU 60 derives the deceleration of the preceding vehicle 100 on the basis of the inter-vehicle distance between the host vehicle 1 and the preceding vehicle 100, acquired by the forward condition acquisition unit 61. That is, the deceleration at the time of deceleration of the preceding vehicle 100 is derived by the preceding vehicle deceleration deriving unit 63 on the basis of the rate of the inter-vehicle distance variation between the host vehicle 1 and the preceding vehicle 100, acquired by the forward condition acquisition unit 61.

In addition, the preceding vehicle deceleration deriving unit 63 derives the preceding vehicle maximum deceleration that is the maximum deceleration of the preceding vehicle 100 on the basis of the rate of variation in the derived deceleration of the preceding vehicle 100, a vehicle speed, a driving environment at that time, and the like, and, further, derives the maximum deceleration jerk of the preceding vehicle 100. After the preceding vehicle deceleration deriving unit 63 is used to derive the preceding vehicle maximum deceleration, the equivalent response time calculation unit 31 of the running control ECU 20 is used to calculate the equivalent response time on the basis of the maximum deceleration jerk of the host vehicle 1, the maximum deceleration of the preceding vehicle 100 and the maximum deceleration jerk of the preceding vehicle 100. In addition, the equivalent response time and the preceding vehicle maximum deceleration derived by the preceding vehicle deceleration deriving unit 63 of the autonomous follow-up running control ECU 60 are transmitted to the running control ECU 20 as the running information of the preceding vehicle 100, and the deceleration calculation unit 33 of the running control ECU 20 is used to calculate the deceleration of the host vehicle 1 on the basis of the equivalent response time and the preceding vehicle maximum deceleration.

When the deceleration of the host vehicle 1 is calculated by the deceleration calculation unit 33 during autonomous follow-up running control, as in the case during communication follow-up running control, the deceleration of the host vehicle 1 is calculated on the basis of the inter-vehicle time set on the basis of the vehicle speed of the host vehicle 1 before deceleration. That is, the set inter-vehicle time $\tau$ preset for autonomous follow-up running and the preceding vehicle maximum deceleration $a_{1\_max}$ that is the maximum deceleration of the preceding vehicle 100 derived by the preceding vehicle deceleration deriving unit 63 are used to compute the above mathematical expression (2), that is, $(V_{r\_max} = \tau \cdot a_{1\_max})$, using the deceleration relative speed calculation unit 35 to thereby calculate the maximum value $V_{r\_max}$ of the relative speed. At this time, when the deceleration jerk performance of the preceding vehicle 100 is higher than the deceleration jerk performance of the host vehicle 1, the maximum value $V_{r\_max}$ of the relative speed is calculated so that the timing at which the host vehicle 1 is decelerated by the autonomous follow-up running control ECU 60 in response to deceleration of the preceding vehicle 100 is advanced as compared with the case where the deceleration jerk performance of the preceding vehicle 100 is lower than the deceleration jerk performance of the host vehicle 1.

In this way, when the timing at which the host vehicle 1 is decelerated is advanced, as in the case during communication follow-up running control, the deceleration timing is advanced until the deceleration jerk performance of the host vehicle 1 is able to satisfy the relationship (equivalent response time $t_{delay} \leq$ set inter-vehicle time $\tau$). By so doing, the maximum value $V_{r\_max}$ of the relative speed is a value that allows the deceleration of the host vehicle 1 at the time of deceleration to be controllable, including a deceleration after the initial rising of the deceleration and that can achieve a variation in deceleration required to change the deceleration at the time when the host vehicle 1 is decelerated to a deceleration equal to the deceleration of the preceding vehicle 100 after a lapse of the inter-vehicle time from a current vehicle speed is calculated.

Note that, when the deceleration jerk performance of the host vehicle 1 is able to satisfy the relationship (equivalent response time $t_{delay} \leq$ set inter-vehicle time $\tau$), a parameter other than the deceleration timing may be used for adjustment. For example, the inter-vehicle distance setting unit 41 and the inter-vehicle distance setting unit 62 may serve as an inter-vehicle control unit that changes the inter-vehicle time or inter-vehicle distance between the preceding vehicle 100 and the host vehicle 1 on the basis of the deceleration jerk of the preceding vehicle 100, and the inter-vehicle time or the inter-vehicle distance may be changed on the basis of the deceleration jerk so as to satisfy the relationship (equivalent response time $t_{delay} \leq$ set inter-vehicle time $\tau$) at the time of deceleration. More specifically, the inter-vehicle distance setting unit 41 and the inter-vehicle distance setting unit 62 may serve as an inter-vehicle relation increasing unit that increases the inter-vehicle time or inter-vehicle distance between the preceding vehicle 100 and the host vehicle 1 when the deceleration jerk performance of the preceding vehicle 100 is higher than the deceleration jerk performance of the host vehicle 1 as compared with when the deceleration jerk performance of the preceding vehicle 100 is lower than the deceleration jerk performance of the host vehicle 1, and the inter-vehicle time or the inter-vehicle distance may be changed so as to satisfy the relationship (equivalent response time $t_{delay} \leq$ set inter-vehicle time $\tau$) at the time of deceleration.

In addition, in communication follow-up running control, the running information of the preceding vehicle 100 is acquired through inter-vehicle communication, so the deceleration of the preceding vehicle 100 and the timing at which the preceding vehicle 100 starts decelerating may be further accurately recognized; however, in autonomous follow-up running control, the deceleration of the preceding vehicle 100 is derived on the basis of the inter-vehicle distance between the host vehicle 1 and the preceding vehicle 100. Therefore, the deceleration of the preceding vehicle 100 derived in autonomous follow-up running control is lower in accuracy than the deceleration of the preceding vehicle 100 derived in communication follow-up running control. Thus, in autonomous follow-up running control, it is more difficult to execute deceleration control over the host vehicle 1, which is optimal to an actual relative running state between the preceding vehicle 100 and the host vehicle 1 as compared with communication follow-up running control; however, even in the autonomous follow-up running control, as in the case during communication follow-up running control, it is desirable to calculate the deceleration of the host vehicle 1 for a lapse of the inter-vehicle time as much as possible.

In communication follow-up running control or in autonomous follow-up running control, after the deceleration of the host vehicle 1 is derived on the basis of the deceleration of the preceding vehicle 100 in this way, the brake control unit 22 controls the brake hydraulic control device 8 in response to the derived deceleration in order to cause the host vehicle 1 to decelerate at the derived deceleration. At this time, in any one of communication follow-up running control and autonomous follow-up running control, the relative speed $V_r$ of the preceding vehicle 100 is calculated from the rate of variation in the result detected by the radar 12 using the relative speed calculation unit 34, and the deceleration is controlled so that the relative speed $V_r$ is lower than or equal to the maximum value $V_{r\_max}$ of the relative speed, calculated by the deceleration relative speed calculation unit 35. Therefore, when braking force is actually adjusted to cause the host vehicle 1 to decelerate at a deceleration, control over the deceleration, including control after the initial rising of the deceleration, is executed to perform feedback control over the deceleration. By so doing, the host vehicle 1 is caused to appropriately decelerate at the calculated deceleration.

Figure 13:
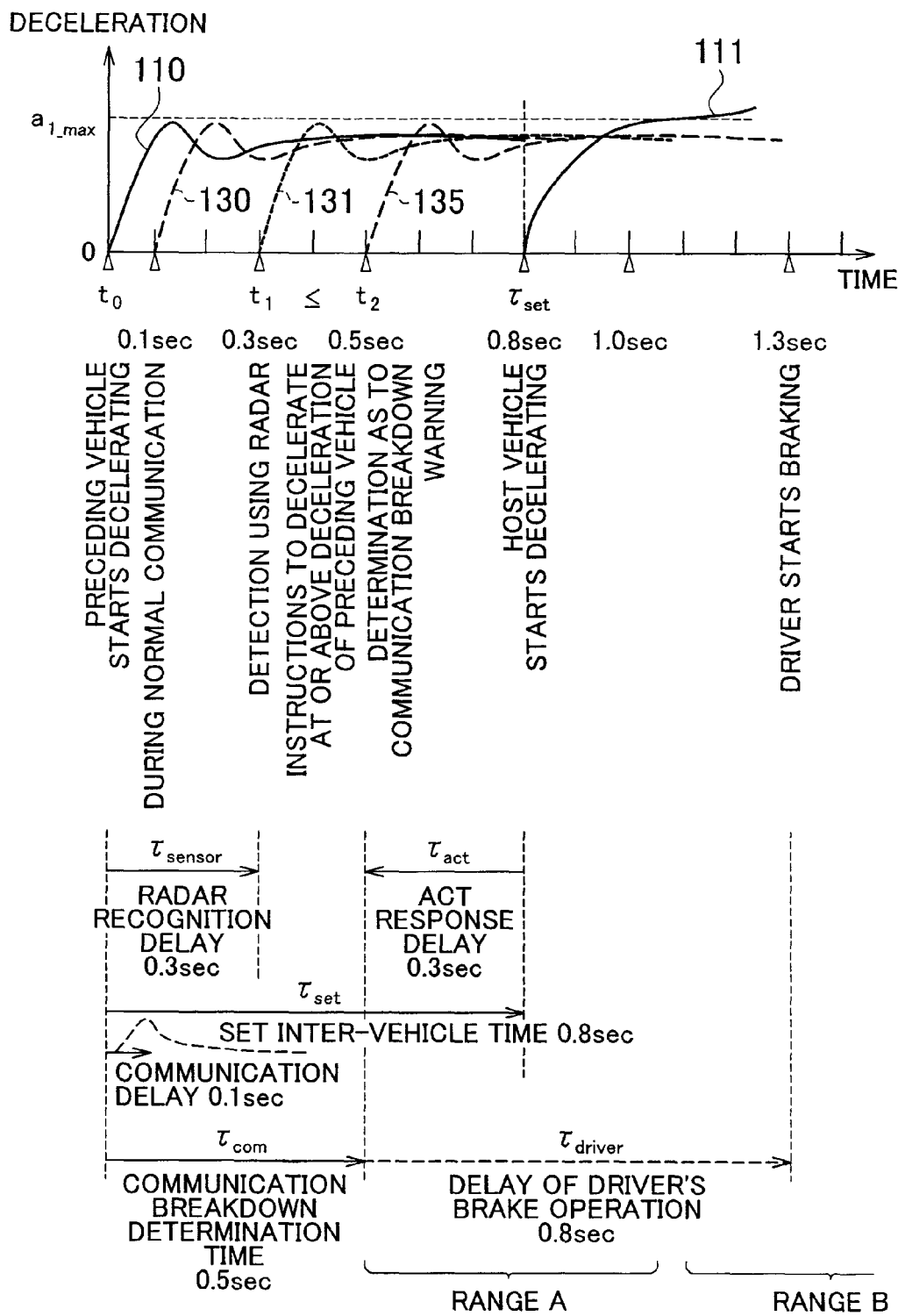
FIG. 13 is a time chart that illustrates control in the event of a communication breakdown according to the embodiment of the invention.

In addition, during communication follow-up running control, control is executed while it is determined whether there is a communication breakdown; however, in order to further reliably reduce the possibility that the host vehicle 1 hits the rear end of the preceding vehicle 100 in the event of a communication breakdown, when a communication breakdown starts occurring, preparations for brake control are started during the communication breakdown before a communication breakdown is determined. FIG. 13 is a time chart that illustrates control in the event of a communication breakdown. For example, the case where communication follow-up running control is executed with an inter-vehicle time of 0.8 s will be described. In the case where the inter-vehicle time is 0.8 s, when the host vehicle 1 is able to decelerate at a deceleration equal to the deceleration of the preceding vehicle 100, the host vehicle 1 starts decelerating within 0.8 s after the start of deceleration of the preceding vehicle 100 to thereby reduce the possibility that the host vehicle 1 hits the rear end of the preceding vehicle 100. That is, after the initial rising of the preceding vehicle acceleration 110, the host vehicle acceleration 111 rises within 0.8 s; however, there occurs a communication delay of about 0.1 s in inter-vehicle communication used in communication follow-up running control. Therefore, a communication-detectable preceding vehicle acceleration 130, which is the preceding vehicle acceleration 110 that may be detected by the host vehicle 1 through inter-vehicle communication during communication follow-up running control, is detected by the host vehicle 1 after 0.1 s from the occurrence of the preceding vehicle acceleration 110.

In addition, deceleration of the preceding vehicle 100 may also be detected by the radar 12. In the event of a communication breakdown during communication follow-up running control, deceleration of the preceding vehicle 100 is detected by the radar 12; however, when deceleration of the preceding vehicle 100 is detected by the radar 12, there is a radar recognition delay of about 0.3 s. Therefore, a radar-detectable preceding vehicle acceleration 131, which is the preceding vehicle acceleration 110 that may be detected by the host vehicle 1 using the radar 12, is detected by the host vehicle 1 after 0.3 s from the occurrence of the preceding vehicle acceleration 110.

In addition, when a control signal is transmitted to the brake hydraulic control device 8 to actually generate braking force using actuators, such as wheel cylinders, there occurs a response delay of about 0.3 s. Therefore, when the deceleration is controlled so that the response time of the host vehicle 1 after the start of deceleration of the preceding vehicle 100 falls below the set inter-vehicle time that is the inter-vehicle time between the host vehicle 1 and the preceding vehicle 100, decelerating instructions on a host vehicle request acceleration 135 that causes the host vehicle 1 to decelerate at the host vehicle acceleration 111 0.3 s before the set inter-vehicle time at the latest are issued. Therefore, when communication is lost after the preceding vehicle running information acquisition unit 45 acquires the fact that the preceding vehicle 100 starts decelerating during communication follow-up running control, determination as to a communication breakdown is waited until 0.3 s before the set inter-vehicle time, that is, until 0.5 s after the preceding vehicle 100 starts decelerating.

More specifically, when communication is lost after the preceding vehicle 100 starts decelerating, until a lapse of 0.3 s during which the radar 12 is able to detect the running state of the preceding vehicle 100, deceleration control over the host vehicle 1 may be executed using the result detected by the radar 12 even when communication is lost, so recovery of communication is waited until a lapse of 0.3 s. After a lapse of 0.3 s from the start of deceleration of the preceding vehicle 100, deceleration control over the host vehicle 1 cannot be executed using the result detected by the radar 12, so determination as to a communication breakdown is waited in a state where preparations for increasing hydraulic pressure generated by the brake hydraulic control device 8 are made.

On the other hand, in a state where preparations for increasing hydraulic pressure generated by the brake hydraulic control device 8 are made, when communication is recovered before a lapse of 0.5 s from the start of deceleration of the preceding vehicle 100, the hydraulic pressure is set to 0 and the running control returns to normal communication follow-up running control. That is, in a state where $t_1$ that is the time at which the preceding vehicle 100 is detectable by the radar 12 after a radar recognition delay from when the preceding vehicle 100 starts decelerating and $t_2$ that is the time at which decelerating instructions on the host vehicle request acceleration 135 are issued do not satisfy the relationship ($t_1 \leq t_2$), when there occurs a communication breakdown, a request to the brake actuators is started before determination as to a communication breakdown. In other words, when communication follow-up running control is executed, it is required to satisfy the relationship ($\tau_{sensor} + \tau_{act} \leq \tau_{set}$) where a radar recognition delay $\tau_{sensor}$ that is a detection delay time from a start point $t_0$ of deceleration control over the preceding vehicle 100 to when the host vehicle 1 detects the start of deceleration control over the preceding vehicle 100 on the basis of the running information, an actuator response delay $\tau_{act}$ that is a control response delay time from when the host vehicle 1 transmits a deceleration control signal to when the host vehicle 1 actually starts deceleration control and a set inter-vehicle time $\tau_{set}$ that is the inter-vehicle time between the preceding vehicle 100 and the host vehicle 1. When the radar recognition delay $\tau_{sensor}$, the actuator response delay $\tau_{act}$ and the set inter-vehicle time $\tau_{set}$ do not satisfy the requirement, control during the communication breakdown is executed.

In addition, a communication breakdown determination time $\tau_{com}$ is required so that the relationship among the communication breakdown determination time τcom, the actuator response delay $\tau_{act}$ and the set inter-vehicle time $\tau_{set}$ satisfies ($\tau_{com} + \tau_{act} \leq \tau_{set}$). Therefore, instructions on a deceleration are started the actuator response delay $\tau_{act}$ before the set inter-vehicle time $\tau_{set}$. That is, determination as to a communication breakdown may be waited until the actuator response delay $\tau_{act}$ before the set inter-vehicle time $\tau_{set}$.

In addition, when a communication breakdown is determined at the time of deceleration of the preceding vehicle 100 in communication follow-up running control, a notification that communication with the preceding vehicle 100 is lost is provided to the driver. For example, a warning sound is provided, when the communication breakdown determination time $\tau_{com}$ lapses, to thereby notify the driver that communication is lost. The driver performs brake operation after a predetermined period of time from when the driver hears the warning. That is, the driver performs brake operation after a lapse of a driver brake operation delay $\tau_{driver}$ from when a communication breakdown is determined because of a response delay of the driver itself after the driver hears the warning.

In this way, even when communication is lost during communication follow-up running control, in a range A until the deceleration of the host vehicle 1 rises, instructions on a deceleration larger than or equal to that of the preceding vehicle 100 are started the actuator response delay $\tau_{act}$ before a lapse of the set inter-vehicle time $\tau_{set}$ so that the equivalent response time $t_{delay}$ and the set inter-vehicle time $\tau$ satisfy the relationship ($t_{delay} \leq \tau$). In addition, in a range B after the deceleration of the host vehicle 1 rises, appropriate feedback control is executed on the basis of the result detected by the radar 12 after the deceleration of the host vehicle 1 rises so that the relative speed $V_r$, the set inter-vehicle time $\tau$ and the preceding vehicle maximum deceleration $a_{1\_max}$ satisfy the relationship ($V_r \leq V_{r\_max} = \tau \cdot a_{1\_max}$).

In addition, when another vehicle cuts in between the preceding vehicle 100 and the host vehicle 1 during communication follow-up running control or during autonomous follow-up running control, the inter-vehicle time between the cut-in vehicle and the host vehicle 1 becomes different from the inter-vehicle time set in communication follow-up running control or autonomous follow-up running control. In this case, the radar 12 is used to detect the cut-in vehicle, and sets an inter-vehicle time on the basis of the detected result.

That is, during any one of communication follow-up running control and autonomous follow-up running control, follow-up running control is executed in such a manner that the radar 12 is used to detect a condition ahead of the host vehicle 1 and then the detected result is acquired by the forward condition acquisition unit 61 of the autonomous follow-up running control ECU 60; however, when there appears an obstacle of which the relative speed with respect to the host vehicle 1 is not so high (the relative speed with respect to the host vehicle 1 is lower than a predetermined relative speed) at a position closer to the host vehicle 1 than the inter-vehicle distance between the preceding vehicle 100 and the host vehicle 1 during follow-up running control, the obstacle is determined as another vehicle. In this case, the vehicle is determined as a preceding vehicle 100, the forward condition acquisition unit 61 is used to acquire the inter-vehicle distance between the host vehicle 1 and the new preceding vehicle 100 on the basis of the result detected by the radar 12, and the inter-vehicle time detecting unit 30 is used to detect an inter-vehicle time on the basis of the inter-vehicle distance acquired by the forward condition acquisition unit 61 and a current vehicle speed acquired by the vehicle speed acquisition unit 25.

When the new preceding vehicle 100 appears by another vehicle cutting in ahead of the host vehicle 1 during communication follow-up running control or autonomous follow-up running control, follow-up running control is executed on the basis of the inter-vehicle time detected by the inter-vehicle time detecting unit 30 in this way. Therefore, when the new preceding vehicle 100 decelerates, the host vehicle 1 is caused to decelerate at a deceleration equal to the deceleration of the new preceding vehicle 100 by the time when the inter-vehicle time detected by the inter-vehicle time detecting unit 30 elapses.

In addition, when the braking response characteristic is different between the preceding vehicle 100 and the host vehicle 1 and the host vehicle 1 is not able to generate the maximum deceleration jerk at the time of deceleration of the preceding vehicle 100, the inter-vehicle distance is increased to extend the inter-vehicle time to thereby set the equivalent response time so as to be shorter than the inter-vehicle time.

Figure 14:
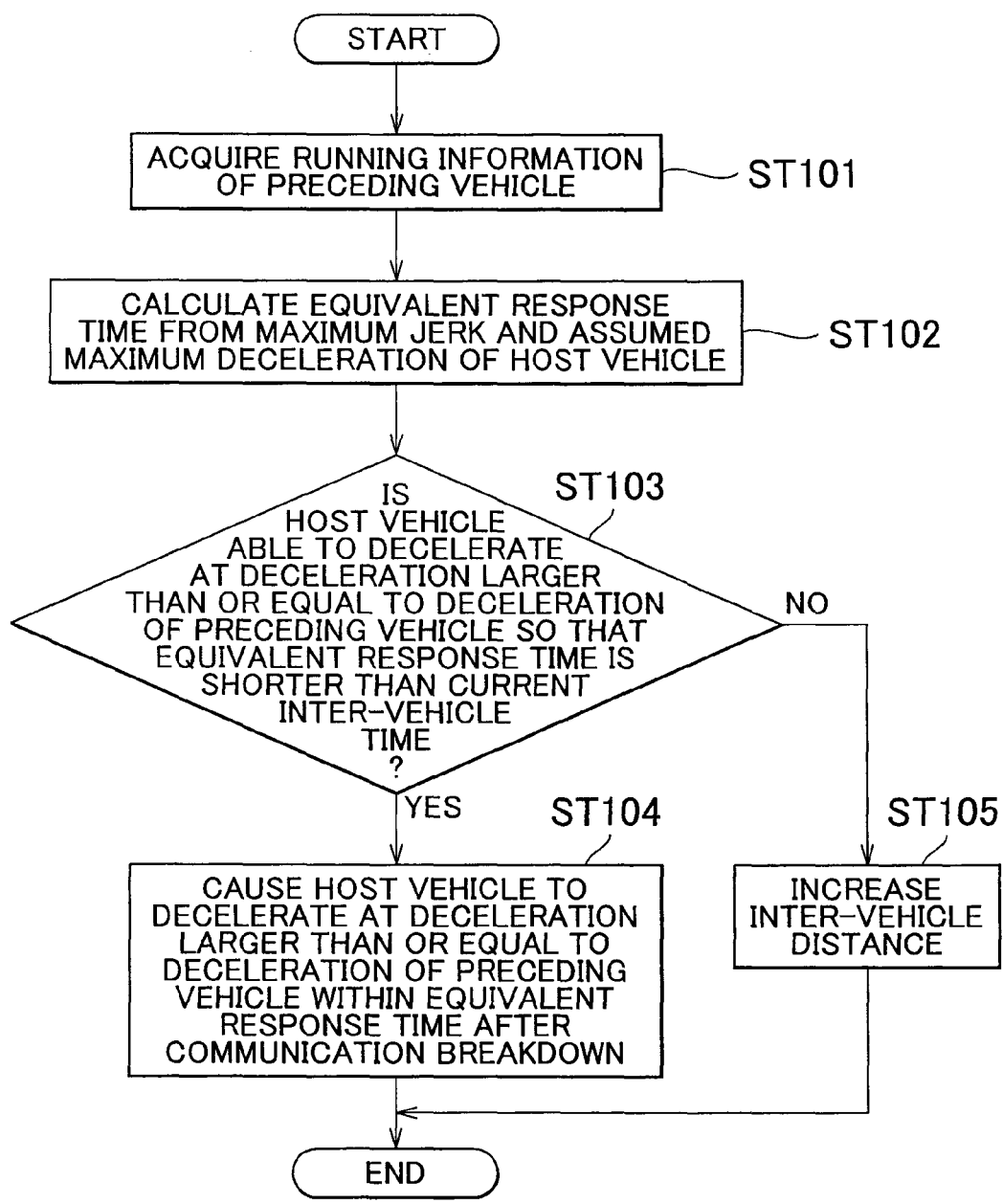
FIG. 14 is a flowchart in the case where braking control is executed using an equivalent response time according to the embodiment of the invention.

FIG. 14 is a flowchart when braking control is executed using an equivalent response time. Next, the procedure in the case where control for decelerating the host vehicle 1 is executed using the equivalent response time when the preceding vehicle 100 decelerates in a state where the braking response characteristic is different between the host vehicle 1 and the preceding vehicle 100 will be described. When braking control is executed using the equivalent response time, first, the running information of the preceding vehicle 100 is acquired (step ST101). The running information is acquired by the preceding vehicle running information acquisition unit 45 of the communication follow-up running control ECU 40. The preceding vehicle running information acquisition unit 45 acquires the running information of the preceding vehicle 100 from the inter-vehicle communication device 15 that has received data from the preceding vehicle 100 through inter-vehicle communication with the preceding vehicle 100 using the inter-vehicle communication device 15. The running information acquired by the preceding vehicle running information acquisition unit 45 is, for example, the vehicle speed and acceleration of the preceding vehicle 100, the maximum jerk of the preceding vehicle 100 at the time of deceleration, or the like.

Subsequently, an equivalent response time is calculated from the maximum jerk and assumed maximum deceleration of the host vehicle 1 (step ST102). The equivalent response time is calculated by the equivalent response time calculation unit 31 of the running control ECU 20. The maximum jerk, that is, the maximum deceleration jerk, of the host vehicle 1, which is used to calculate the equivalent response time using the equivalent response time calculation unit 31, is estimated on the basis of the friction $\mu$ of a road on which the host vehicle 1 is running. The friction $\mu$ is estimated in advance on the basis of an actual acceleration or deceleration when driving force or braking force is transmitted to a road during running of the vehicle 1. In addition, for the assumed maximum deceleration, the preceding vehicle maximum deceleration deriving unit 46 of the communication follow-up running control ECU 40 is used to derive the maximum deceleration of the preceding vehicle 100 at the time of deceleration of the preceding vehicle 100 from the running information of the preceding vehicle 100, acquired by the preceding vehicle running information acquisition unit 45. The equivalent response time calculation unit 31 first obtains the area $S_b$ of a trapezoid that indicates the total amount of difference in acceleration because the host vehicle 1 starts decelerating after a response time from deceleration of the preceding vehicle 100 on the basis of the maximum deceleration jerk of the host vehicle 1, the maximum deceleration of the preceding vehicle 100 and the maximum deceleration jerk of the preceding vehicle 100, acquired by the preceding vehicle running information acquisition unit 45. In addition, a parallelogram of which the area is equal to the area $S_b$ of the trapezoid and the height is the maximum deceleration of the preceding vehicle is derived. The equivalent response time calculation unit 31 calculates the length of the base of the parallelogram as the equivalent response time.

After that, it is determined whether the host vehicle 1 is able to decelerate at a deceleration larger than or equal to that of the preceding vehicle 100 so that the equivalent response time is shorter than the current inter-vehicle time (step ST103). The above determination is made by the deceleration determining unit 32 of the running control ECU 20. That is, the deceleration determining unit 32 determines whether it is possible to set the equivalent response time so as to be shorter than the current inter-vehicle time to cause the host vehicle 1 to decelerate at a deceleration larger than or equal to the deceleration of the preceding vehicle 100 in consideration of a recognition delay of the radar 12 in the case where inter-vehicle communication used in communication follow-up running control is lost, a response delay of the actuators used for deceleration, and the like.

As a result of the determination made by the deceleration determining unit 32 (step ST103), when it is determined that the host vehicle 1 is able to decelerate at a deceleration larger than or equal to that of the preceding vehicle 100 so that the equivalent response time is shorter than the current inter-vehicle time, the host vehicle 1 decelerates at the deceleration larger than or equal to that of the preceding vehicle 100 within the equivalent response time after a communication breakdown (step ST104). By so doing, even when communication is lost, the host vehicle 1 is able to decelerate at the deceleration by which it is possible to reduce the possibility that the host vehicle 1 hits the rear end of the preceding vehicle 100.

In contrast to this, as a result of the determination made by the deceleration determining unit 32 (step ST103), when it is determined that the host vehicle 1 is not able to decelerate at the deceleration larger than or equal to that of the preceding vehicle 100 so that the equivalent response time is shorter than the current inter-vehicle time, the inter-vehicle distance is increased (step ST105). That is, in this case, the inter-vehicle distance between the preceding vehicle 100 and the host vehicle 1 is increased to thereby set the inter-vehicle time so as to be longer than the equivalent response time. By so doing, the host vehicle 1 is caused to be able to decelerate at a deceleration larger than or equal to the deceleration of the preceding vehicle 100 by the time when the inter-vehicle time elapses after the start of deceleration of the preceding vehicle 100.

The above described vehicle control device 2 is able to decelerate the host vehicle 1 in consideration of the difference between the braking response characteristic of the preceding vehicle 100 and the braking response characteristic of the host vehicle 1 even when the braking response characteristic of the preceding vehicle 100 is higher than the braking response characteristic of the host vehicle 1 during follow-up running control in order to change the deceleration timing of the host vehicle 1 at the time of deceleration of the preceding vehicle 100 on the basis of the deceleration jerk of the preceding vehicle 100 in the acquired running information of the preceding vehicle 100. As a result, irrespective of a relative difference in braking response characteristic between the preceding vehicle 100 and the host vehicle 1, it is possible to appropriately decelerate the host vehicle 1 during follow-up running control.

In addition, the deceleration start timing of the host vehicle 1 is advanced at the time of deceleration of the preceding vehicle 100 when the deceleration jerk performance of the preceding vehicle 100 is high as compared with when the deceleration jerk performance of the preceding vehicle 100 is low, so it is possible to prevent a situation that the host vehicle 1 excessively gets close to the preceding vehicle 100 at the time of deceleration of the preceding vehicle 100 because of the relatively high braking response characteristic of the preceding vehicle 100. As a result, irrespective of a relative difference in braking response characteristic between the preceding vehicle 100 and the host vehicle 1, it is possible to appropriately decelerate the host vehicle 1 during follow-up running control.

In addition, the running information of the preceding vehicle 100 may be acquired through inter-vehicle communication between the host vehicle 1 and the preceding vehicle 100, so the deceleration jerk of the preceding vehicle 100 may be accurately acquired by the host vehicle 1. Thus, even when the deceleration timing of the host vehicle 1 is changed or the inter-vehicle time or inter-vehicle distance between the host vehicle 1 and the preceding vehicle 100 is changed on the basis of the deceleration jerk of the preceding vehicle 100, the deceleration timing, the inter-vehicle time or the inter-vehicle distance may be changed so that desired control can be accurately executed. As a result, irrespective of a relative difference in braking response characteristic between the preceding vehicle 100 and the host vehicle 1, it is possible to appropriately and further reliably decelerate the host vehicle 1 during follow-up running control.

In addition, when the inter-vehicle time or inter-vehicle distance between the host vehicle 1 and the preceding vehicle 100 during follow-up running control is changed on the basis of the deceleration jerk of the preceding vehicle 100 in the acquired running information of the preceding vehicle 100 as well, it is possible to decelerate the host vehicle 1 in consideration of the difference in braking response characteristic between the preceding vehicle 100 and the host vehicle 1 when the braking response characteristic of the preceding vehicle 100 is higher than the braking response characteristic of the host vehicle 1. As a result, irrespective of a relative difference in braking response characteristic between the preceding vehicle 100 and the host vehicle 1, it is possible to appropriately decelerate the host vehicle 1 during follow-up running control.

In addition, the inter-vehicle time or inter-vehicle distance between the host vehicle 1 and the preceding vehicle 100 during follow-up running is increased when the deceleration jerk performance of the preceding vehicle 100 is high as compared with when the deceleration jerk performance of the preceding vehicle 100 is low, so it is possible to prevent a situation that the host vehicle 1 excessively gets close to the preceding vehicle 100 at the time of deceleration of the preceding vehicle 100 because of the relatively high braking response characteristic of the preceding vehicle 100. As a result, irrespective of a relative difference in braking response characteristic between the preceding vehicle 100 and the host vehicle 1, it is possible to appropriately decelerate the host vehicle 1 during follow-up running control.

In addition, as described above, by appropriately decelerating the host vehicle 1 irrespective of the relative difference in braking response characteristic, in a state where the host vehicle 1 performs follow-up running behind the preceding vehicle 100, even when the preceding vehicle 100 having a high braking response characteristic decelerates, it is possible to reduce the possibility that the host vehicle 1 hits the rear end of the preceding vehicle 100. As a result, it is possible to further reliably improve safety during follow-up running control.

Note that numeric values in the vehicle control device 2 according to the above described embodiment are examples in the vehicle control device 2 or during follow-up running control, so numeric values in the vehicle control device 2 or during follow-up running control are not limited to the above described values.

In addition, in the vehicle control device 2 according to the above described embodiment, when follow-up running control with respect to the preceding vehicle 100 is executed, control is executed so that the deceleration of the host vehicle 1 at the time of deceleration of the preceding vehicle 100 becomes a deceleration equal to the deceleration of the preceding vehicle 100 by the time when the inter-vehicle time elapses; instead, the vehicle 1 may include another device to execute deceleration control. The vehicle 1 may be, for example, equipped with a pre-crash safety (PCS) device that warns the driver or exerts braking when the vehicle 1 is likely to hit the rear end of the preceding vehicle 100 during normal running in addition to the vehicle control device 2 according to the embodiment. In this case, a PCS ECU (not shown) that serves as a PCS control unit for executing PCS control is provided separately from the communication follow-up running control ECU 40 or the autonomous follow-up running control ECU 60, and, when the PCS ECU determines on the basis of the result detected by the radar 12 that PCS control is executed, the PCS ECU controls the brake hydraulic control device 8 to cause the host vehicle 1 to decelerate at a deceleration. By so doing, even during PCS control, it is possible to reduce the possibility that the host vehicle 1 hits the rear end of the preceding vehicle 100 as much as possible.

That is, the vehicle control device 2 according to the embodiment actively acquires the running information of the preceding vehicle 100 and then appropriately decelerates the host vehicle 1 in response to the deceleration of the preceding vehicle 100 so that the deceleration of the host vehicle 1 does not excessively increases; however, the PCS device decelerates the host vehicle 1 so as to reduce the possibility that the host vehicle 1 hits the rear end of the preceding vehicle 100 when there is the possibility. In this way, with the vehicle control device 2 and the PCS device, it is possible to execute different deceleration controls depending on a condition during running, so it is possible to further appropriately decelerate the host vehicle 1 on the basis of a running condition. In addition, by providing the PCS device in this way, the PCS device is able to reduce the possibility that the vehicle 1 hits the rear end of the preceding vehicle 100 not only during follow-up running but also during normal running in which no follow-up running is performed.

In addition, PCS control executed by the PCS device may be performed in combination with follow-up running control. The vehicle control device 2 may be used to execute deceleration control at the time of normal deceleration of the preceding vehicle 100 in follow-up running control, and deceleration control may be executed by the PCS device when the preceding vehicle 100 steeply decelerates and the vehicle 1 is likely to hit the rear end of the preceding vehicle 100. By so doing, it is possible to further reliably reduce the possibility that the host vehicle 1 hits the rear end of the preceding vehicle 100 during follow-up running control.

As described above, the vehicle control device according to the aspect of the invention is useful in a vehicle that executes follow-up running control with respect to a preceding vehicle and is particularly suitable when inter-vehicle communication is carried out between the vehicle and the preceding vehicle.

The invention claimed is:

1. A vehicle control device comprising:
a follow-up running control unit configured to acquire running information of a preceding vehicle that runs ahead of a host vehicle and to control a running state of the host vehicle based on the acquired running information;
a deceleration jerk acquisition unit configured to acquire deceleration jerk information of the preceding vehicle;
a deceleration timing control unit configured to change a deceleration start timing, at which the follow-up running control unit decelerates the host vehicle in response to deceleration of the preceding vehicle, based on the deceleration jerk information of the preceding vehicle, the deceleration jerk information of the preceding vehicle is not only the deceleration jerk information of a vehicle immediately ahead of the host vehicle but also is the deceleration jerk information of other vehicles within a predetermined range ahead of the host vehicle; and an equivalent response time calculation unit that calculates an equivalent response time $t_{delay}$ that replaces a response time of the host vehicle when the deceleration jerk information indicates that a deceleration jerk of the host vehicle and a deceleration jerk of the preceding vehicle are different from each other with a response time as if the deceleration jerks of the host and preceding vehicles are the same, the response time being a time between a start of deceleration of the preceding vehicle and a start of deceleration of the host vehicle,
wherein, when the deceleration start timing of the host vehicle is advanced due to the deceleration jerk of the preceding vehicle being higher than the deceleration jerk of the host vehicle, a set inter-vehicle time τ is compared with the equivalent response time $t_{delay}$ calculated by the equivalent response time calculation unit, and then the deceleration start timing is advanced so that the deceleration jerk of the host vehicle satisfies the relationship:

$$(\text{equivalent response time } t_{delay} \leq \text{set inter-vehicle time } \tau).$$

2. The vehicle control device according to claim 1, wherein the deceleration jerk acquisition unit acquires the deceleration jerk information of the preceding vehicle through inter-vehicle communication.

3. A vehicle control device comprising:
a follow-up running control unit configured to acquire running information of a preceding vehicle that runs ahead of a host vehicle and to control a running state of the host vehicle based on the acquired running information;
a deceleration jerk acquisition unit configured to acquire deceleration jerk information of the preceding vehicle, the deceleration jerk information of the preceding vehicle is not only the deceleration jerk information of a vehicle immediately ahead of the host vehicle but also is the deceleration jerk information of other vehicles within a predetermined range ahead of the host vehicle;
a deceleration timing advance unit configured to advance a deceleration start timing, at which the follow-up running control unit decelerates the host vehicle in response to deceleration of the preceding vehicle, when deceleration jerk performance of the preceding vehicle is higher than deceleration jerk performance of the host vehicle as compared with when the deceleration jerk performance of the preceding vehicle is lower than the deceleration jerk performance of the host vehicle, the deceleration jerk performance of the preceding vehicle is not only the deceleration jerk performance of the vehicle immediately ahead of the host vehicle but also is the deceleration jerk performance of the other vehicles within the predetermined range ahead of the host vehicle: and
an equivalent response time calculation unit that calculates an equivalent response time $t_{delay}$ that replaces a response time of the host vehicle when the deceleration jerk performance of the host vehicle and the deceleration jerk performance of the preceding vehicle are different from each other with a response time as if the deceleration jerk performances of the host and preceding vehicles are the same, the response time being a time between a start of deceleration of the preceding vehicle and a start of deceleration of the host vehicle,
wherein, when the deceleration start timing of the host vehicle is advanced due to the deceleration jerk performance of the preceding vehicle being hider than the deceleration jerk performance of the host vehicle, a set inter-vehicle time τ is compared with the equivalent response time $t_{delay}$ calculated by the equivalent response time calculation unit, and then the deceleration start timing is advanced so that the deceleration jerk performance of the host vehicle satisfies the relationship:

(equivalent response time $t_{delay}$ ≤ set inter-vehicle time τ).

4. The vehicle control device according to claim 3, wherein the deceleration jerk acquisition unit acquires the deceleration jerk information of the preceding vehicle through inter-vehicle communication.

5. A vehicle control device comprising:
a deceleration jerk acquisition unit configured to acquire deceleration jerk information of a preceding vehicle that runs ahead of a host vehicle;
an inter-vehicle control unit configured to change an inter-vehicle time or inter-vehicle distance between the preceding vehicle and the host vehicle based on the deceleration jerk information of the preceding vehicle, the deceleration jerk information of the preceding vehicle is not only the deceleration jerk information of a vehicle immediately ahead of the host vehicle but also is the deceleration jerk information of other vehicles within a predetermined range ahead of the host vehicle; and
an equivalent response time calculation unit that calculates an equivalent response time $t_{delay}$ that replaces a response time of the host vehicle when the deceleration jerk information indicates that a deceleration jerk of the host vehicle and a deceleration jerk of the preceding vehicle are different from each other with a response time as if the deceleration jerks of the host and preceding vehicles are the same, the response time being a time between a start of deceleration of the preceding vehicle and a start of deceleration of the host vehicle,
wherein, when a deceleration start timing of the host vehicle is advanced due to the deceleration jerk of the preceding vehicle being higher than the deceleration jerk of the host vehicle, a set inter-vehicle time ρ is compared with the equivalent response time $t_{delay}$ calculated by the equivalent response time calculation unit, and then the deceleration start timing is advanced so that the deceleration jerk of the host vehicle satisfies the relationship:

(equivalent response time $t_{delay}$ ≤ set inter-vehicle time τ).

6. The vehicle control device according to claim 5, wherein the deceleration jerk acquisition unit acquires the deceleration jerk information of the preceding vehicle through inter-vehicle communication.

7. A vehicle control device comprising:
a deceleration jerk acquisition unit configured to acquire deceleration jerk information of a preceding vehicle that runs ahead of a host vehicle, the deceleration jerk information of the preceding vehicle is not only the deceleration jerk information of a vehicle immediately ahead of the host vehicle but also is the deceleration jerk information of other vehicles within a predetermined range ahead of the host vehicle;
an inter-vehicle relation increasing unit configured to increase an inter-vehicle time or inter-vehicle distance between the preceding vehicle and the host vehicle when deceleration jerk performance of the preceding vehicle is higher than deceleration jerk performance of the host vehicle as compared with when the deceleration jerk performance of the preceding vehicle is lower than the deceleration jerk performance of the host vehicle, the deceleration jerk performance of the preceding vehicle is not only the deceleration jerk performance of the vehicle immediately ahead of the host vehicle but also is the deceleration jerk performance of the other vehicles within the predetermined range ahead of the host vehicle; and
an equivalent response time calculation unit that calculates an equivalent response time $t_{delay}$ that replaces a response time of the host vehicle when the deceleration jerk performance of the host vehicle and the deceleration jerk performance of the preceding vehicle are different from each other with a response time as if the deceleration jerk performances of the host and preceding vehicles are the same, the response time being a time between a start of deceleration of the preceding vehicle and a start of deceleration of the host vehicle,
wherein, when a deceleration start timing of the host vehicle is advanced due to the deceleration jerk performance of the preceding vehicle being higher than the deceleration jerk performance of the host vehicle, a set inter-vehicle time τ is compared with the equivalent response time $t_{delay}$ calculated by the equivalent response time calculation unit, and then the deceleration start timing is advanced so that the deceleration jerk performance of the host vehicle satisfies the relationship:

(equivalent response time $t_{delay}$ ≤ set inter-vehicle time τ).

8. The vehicle control device according to claim 7, wherein the deceleration jerk acquisition unit acquires the deceleration jerk information of the preceding vehicle through inter-vehicle communication.

9. A vehicle control device comprising:
a deceleration jerk acquisition unit configured to acquire deceleration jerk information of a preceding vehicle that runs ahead of a host vehicle, the deceleration jerk information of the preceding vehicle is not only the deceleration jerk information of a vehicle immediately ahead of the host vehicle but also is the deceleration jerk information of other vehicles within a predetermined range ahead of the host vehicle:
an inter-vehicle relation increasing unit configured to increase an inter-vehicle time or inter-vehicle distance between the preceding vehicle and the host vehicle when deceleration jerk performance of the preceding vehicle is higher than deceleration jerk performance of the host vehicle as compared with when the deceleration jerk performance of the preceding vehicle is lower than the deceleration jerk performance of the host vehicle, the deceleration jerk performance of the preceding vehicle is not only the deceleration jerk performance of the vehicle immediately ahead of the host vehicle but also is the deceleration jerk performance of the other vehicles within the predetermined range ahead of the host vehicle, wherein the inter-vehicle relation increasing unit increases the inter-vehicle time between the preceding vehicle and the host vehicle when the deceleration jerk performance of the preceding vehicle is higher than the deceleration jerk performance of the host vehicle as compared with when the deceleration jerk performance of the preceding vehicle is lower than the deceleration jerk performance of the host vehicle; and
a communication breakdown determining unit configured to determine a communication breakdown, when the communication breakdown determining unit detects a communication breakdown when the deceleration jerk acquisition unit acquires the deceleration jerk information, and when the increased inter-vehicle time is shorter than a time that is obtained by adding a response delay time of an actuator, which causes deceleration of the host vehicle, to an acquisition delay time of the deceleration jerk information, wherein the communication breakdown determining unit notifies a driver of the host vehicle of the communication breakdown when the communication breakdown is determined.

10. The vehicle control device according to claim 9, wherein the actuator is a brake hydraulic control device, and when the acquisition delay time of the deceleration jerk information has elapsed, preparations of increase of hydraulic pressure by the brake hydraulic control device are made before the communication breakdown is determined.

11. A vehicle control method of a vehicle that includes a follow-up running control unit, a deceleration jerk acquisition unit, a deceleration timing control unit and an equivalent response time calculation unit, the method comprising:

acquiring, by the follow-up running control unit, running information of a preceding vehicle that runs ahead of a host vehicle;

controlling, by the follow-up running control unit, a running state of the host vehicle based on the acquired running information;

acquiring, by the deceleration jerk acquisition unit, deceleration jerk information of the preceding vehicle;

changing, by the deceleration timing control unit, a deceleration start timing, at which the host vehicle is decelerated in response to deceleration of the preceding vehicle, based on the deceleration jerk information of the preceding vehicle; and calculating, by the equivalent response time calculation unit, an equivalent response time $t_{delay}$ that replaces a response time of the host vehicle when the deceleration jerk information indicates that a deceleration jerk of the host vehicle and a deceleration jerk of the preceding vehicle are different from each other with a response time as if the deceleration jerks of the host and preceding vehicles are the same. the response time being a time between a stall of deceleration of the preceding vehicle and a start of deceleration of the host vehicle.

wherein the deceleration jerk information of the preceding vehicle is not only the deceleration jerk information of a vehicle immediately ahead of the host vehicle but also is the deceleration jerk information of other vehicles within a predetermined range ahead of the host vehicle, and wherein, when the deceleration start timing of the host vehicle is advanced due to the deceleration jerk of the preceding vehicle being higher than the deceleration jerk of the host vehicle, a set inter-vehicle time τ is compared with the equivalent response time $t_{delay}$ calculated by the equivalent response time calculation unit, and then the deceleration start timing is advanced so that the deceleration jerk of the host vehicle satisfies the relationship:

(equivalent response time $t_{delay}$ ≤ set inter-vehicle time τ).

12. A vehicle control method of a vehicle that includes a deceleration jerk acquisition unit, a deceleration timing control unit and an equivalent response time calculation unit, the method comprising:

acquiring, by the deceleration jerk acquisition unit, deceleration jerk information of a preceding vehicle that runs ahead of a host vehicle;

changing, by the deceleration timing control unit, an inter-vehicle time or inter-vehicle distance between the preceding vehicle and the host vehicle based on the deceleration jerk information of the preceding vehicle; and calculating, by the equivalent response time calculation unit, an equivalent response time $t_{delay}$ that replaces a response time of the host vehicle when the deceleration jerk information indicates that a deceleration jerk of the host vehicle and a deceleration jerk of the preceding vehicle are different from each other with a response time as if the deceleration jerks of the host and preceding vehicles are the same, the response time being a time between a start of deceleration of the preceding vehicle and a start of deceleration of the host vehicle.

wherein the deceleration jerk information of the preceding vehicle is not only the deceleration jerk information of a vehicle immediately ahead of the host vehicle but also is the deceleration jerk information of other vehicles within a predetermined range ahead of the host vehicle, and wherein, when a deceleration start timing of the host vehicle is advanced due to the deceleration jerk of the preceding vehicle being higher than the deceleration jerk of the host vehicle, a set inter-vehicle time τ is compared with the equivalent response time $t_{delay}$ calculated by the equivalent response time calculation unit, and then the deceleration start timing is advanced so that the deceleration jerk of the host vehicle satisfies the relationship:

(equivalent response time $t_{delay}$ ≤ set inter-vehicle time τ).

* * * * *